United States Patent
Seo et al.

(10) Patent No.: US 9,660,787 B2
(45) Date of Patent: May 23, 2017

(54) METHOD AND APPARATUS FOR TRANSMITTING RECEPTION ACKNOWLEDGEMENT IN WIRELESS COMMUNICATION SYSTEM

(71) Applicant: LG ELECTRONICS INC., Seoul (KR)

(72) Inventors: Hanbyul Seo, Anyang-si (KR); Inkwon Seo, Anyang-si (KR); Hyukjin Chae, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 14/420,286

(22) PCT Filed: Aug. 7, 2013

(86) PCT No.: PCT/KR2013/007126
§ 371 (c)(1),
(2) Date: Feb. 6, 2015

(87) PCT Pub. No.: WO2014/025205
PCT Pub. Date: Feb. 13, 2014

(65) Prior Publication Data
US 2015/0229455 A1  Aug. 13, 2015

Related U.S. Application Data

(60) Provisional application No. 61/680,691, filed on Aug. 7, 2012, provisional application No. 61/706,770, filed
(Continued)

(51) Int. Cl.
*H04W 4/00* (2009.01)
*H04L 5/00* (2006.01)
(Continued)

(52) U.S. Cl.
CPC .......... *H04L 5/0055* (2013.01); *H04L 1/1861* (2013.01); *H04L 5/0007* (2013.01); *H04W 72/0413* (2013.01); *H04W 72/00* (2013.01)

(58) Field of Classification Search
CPC ...... H04W 72/04; H04W 88/08; H04W 76/00
See application file for complete search history.

(56) References Cited

U.S. PATENT DOCUMENTS

2012/0320848 A1* 12/2012 Chen ..................... H04L 5/0055
370/329
2013/0194931 A1*  8/2013 Lee ....................... H04L 5/0053
370/241

(Continued)

OTHER PUBLICATIONS

U.S. Appl. No. 61/646,448 Provisional Specification.*

(Continued)

*Primary Examiner* — Hassan Phillips
*Assistant Examiner* — Siren Wei
(74) *Attorney, Agent, or Firm* — Birch, Stewart, Kolasch & Birch, LLP

(57) ABSTRACT

One embodiment of the present invention is a method in which a terminal transmits an acknowledgement of reception performed through an enhanced physical downlink control channel (EPDCCH) in a wireless communication system, the method comprising the steps of: decoding the EPDCCH in both a first EPDCCH physical resource block (PRB) set and a second EPDCCH PRB set; and transmitting an acknowledgement of reception performed through each EPDCCH. The resource indices for transmitting an acknowledgement of reception performed through each EPDCCH are determined in mutually different manner based on the type of the EPDCCH PRB set, whether or not the number of the PRB pairs contained in each EPDCCH PRB set corresponds to each other, and/or whether or not the EPDCCH PRB sets overlap.

13 Claims, 14 Drawing Sheets

Related U.S. Application Data on Sep. 28, 2012, provisional application No. 61/721,477, filed on Nov. 1, 2012, provisional application No. 61/723,303, filed on Nov. 6, 2012.

(51) Int. Cl.
*H04L 1/18* (2006.01)
*H04W 72/04* (2009.01)
*H04W 72/00* (2009.01)

(56) References Cited

U.S. PATENT DOCUMENTS

| | | | |
|---|---|---|---|
| 2013/0230030 A1* | 9/2013 | Papasakellariou | H04W 72/0406 370/336 |
| 2013/0242890 A1* | 9/2013 | He | H04W 72/0413 370/329 |
| 2013/0294368 A1* | 11/2013 | Bendlin | H04W 72/042 370/329 |

OTHER PUBLICATIONS

U.S. Appl. No. 61/612,188 Provisional Specification.*
U.S. Appl. No. 61/675,518 Provisional Specification.*
U.S. Appl. No. 61/678,612 Provisional Specification.*
Catt, "Design of E-PDCCH Search Space", 3GPP TSG RAN WG1 Meeting #67, San Francisco, USA, Nov. 14-18, 2011. R1-113743 (4 pages).
Huawei, "Antenna Port Association for ePDCCH", 3GPP TSG RAN WG1 Meeting #69, Prague, Czech Republic, May 21-25, 2012. R1-121958 (6 pages).
Intel Corporation., "Search Space Design of ePDCCH", 3GPP TSG RAN WG1 Meeting #67, San Francisco, USA, Nov. 14-18, 2011. R1-113949 (5 pages).
Nokia et al., "On the Reuse of ePDCCH Resources", 3GPP TSG RAN WG1 Meeting #68bis, Prague, Czech Republic, May 21-25, 2012. R1-122607 (6 pages).
Panasonic, "Type 0 and Type 2 PDSCH Assignment on Resources Including ePDCCH Allocation", 3GPP TSG RAN WG1 Meeting #69, Prague, Czech Republic, May 21-25, 2012. R1-122205 (4 pages).

* cited by examiner

FIG. 9
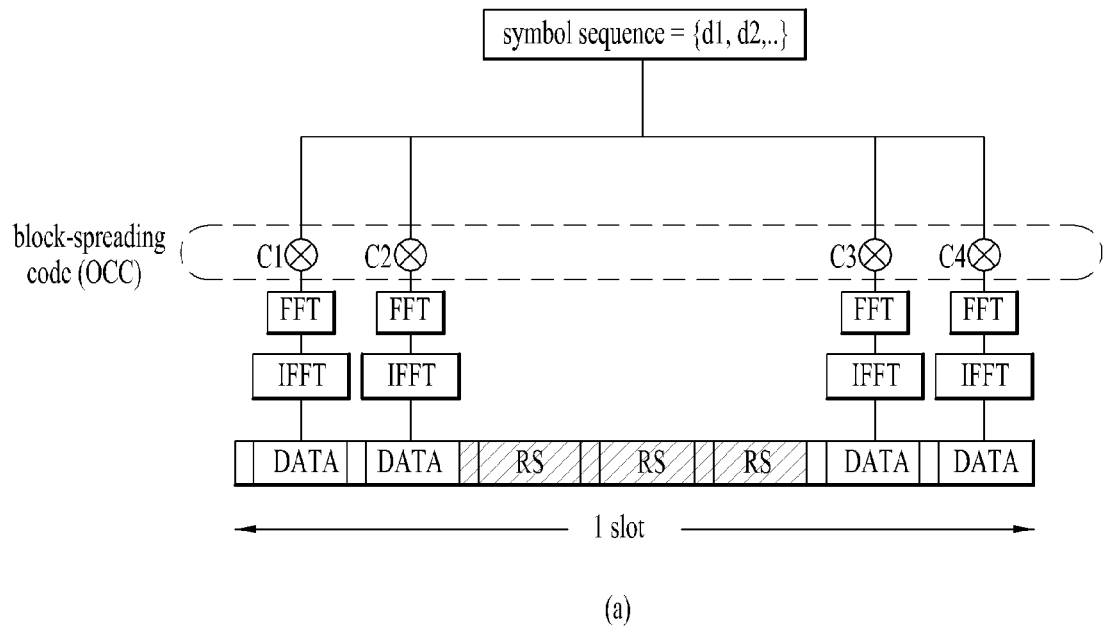
(a)
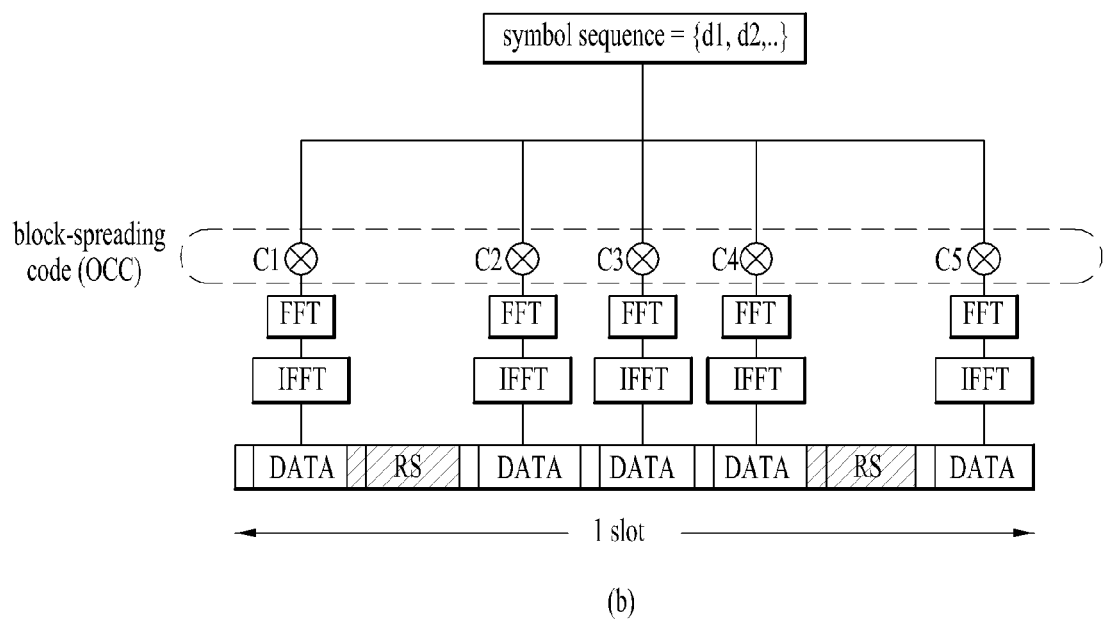
(b)

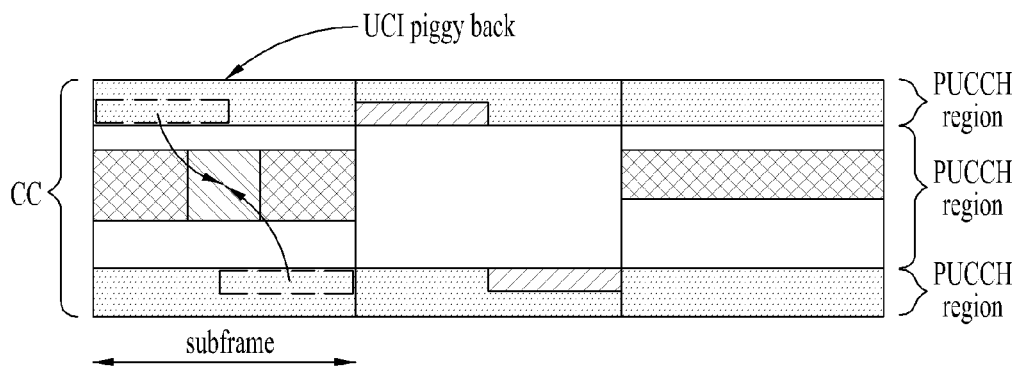

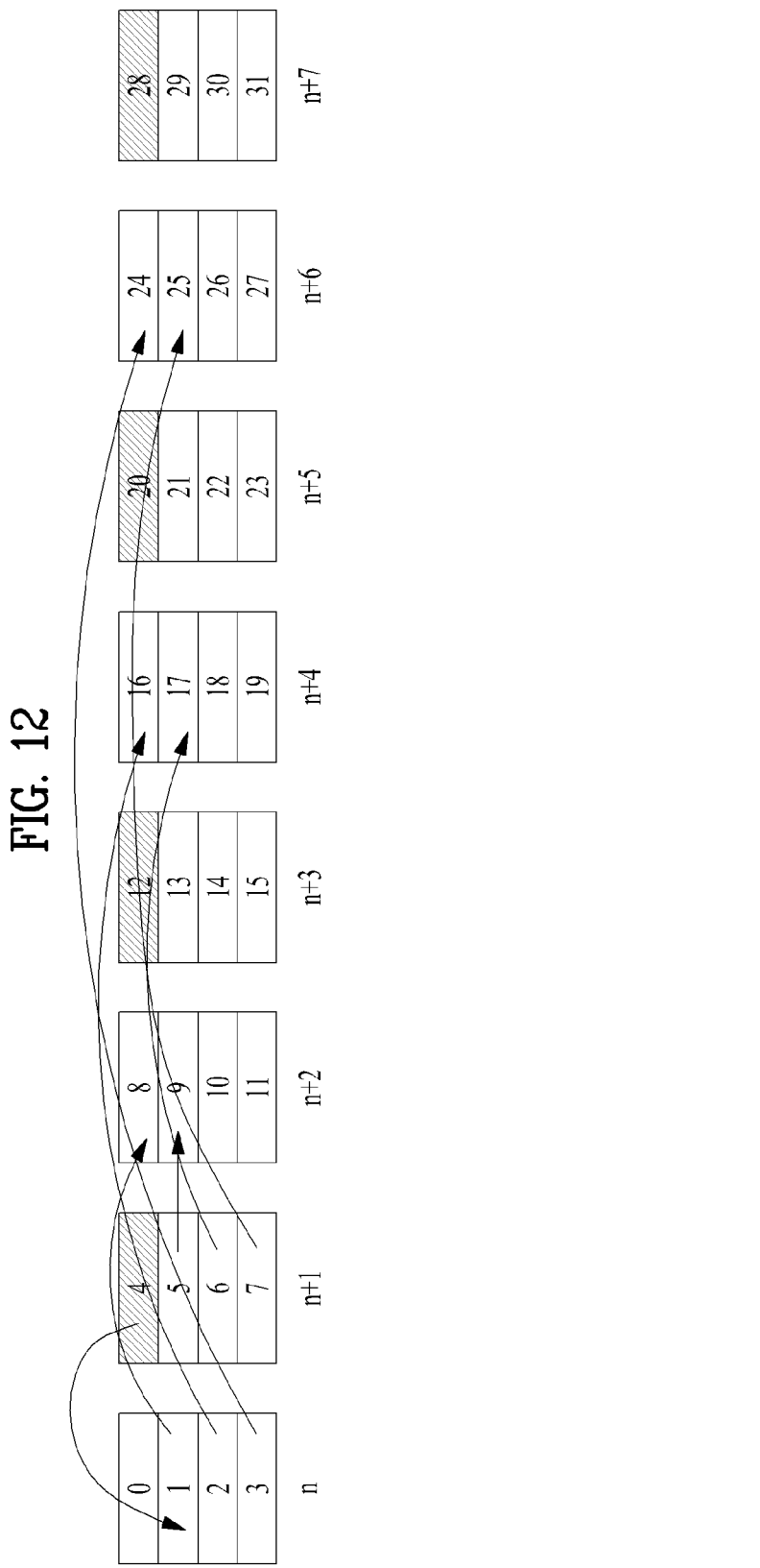

9,660,787 B2

METHOD AND APPARATUS FOR TRANSMITTING RECEPTION ACKNOWLEDGEMENT IN WIRELESS COMMUNICATION SYSTEM

CROSS REFERENCE TO RELATED APPLICATIONS

This application is the National Phase of PCT/KR2013/007126 filed on Aug. 7, 2013, which claims priority under 35 U.S.C. 119(e) to U.S. Provisional Application No. 61/680,691 filed on Aug. 7, 2012; 61/706,770 filed on Sep. 28, 2012; 61/721,477 filed on Nov. 1, 2012, and 61/723,303 filed on Nov. 6, 2012, all of which are hereby expressly incorporated by reference into the present application.

TECHNICAL FIELD

The present invention relates to a wireless communication system and, more particularly, to a method and apparatus for transmitting reception acknowledgement in a wireless communication system when an enhanced physical downlink channel (EPDCCH) is applied.

BACKGROUND ART

Wireless communication systems are widely deployed to provide various kinds of communication services such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE

Technical Problem

An object of the present invention is to provide a method for transmitting reception acknowledgement in response to control information received on an enhanced physical downlink channel (EPDCCH), particularly, in order to solve the problem of collision between resources for transmitting reception acknowledgement.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

According to a first aspect of the present invention, provided herein is a method for transmitting reception acknowledgement for an enhanced physical downlink control channel (EPDCCH) by a user equipment (UE) in a wireless communication system, including decoding an EPDCCH in each of a first EPDCCH Physical Resource Block (PRB) set and a second EPDCCH PRB set, and transmitting reception acknowledgement for each of the EPDCCHs, wherein a resource index for transmitting the reception acknowledgement for each of the EPDCCHs is differently determined depending on at least one of a type of each of the EPDCCH PRB sets, whether or not the EPDCCH PRB sets include the same number of PRB pairs, and whether or not the EPDCCH PRB sets overlap each other.

According to a second aspect of the present invention, provided herein is a user equipment (UE) in a wireless communication system, including a receive module, and a processor, wherein the processor decodes an enhanced physical downlink control channel (EPDCCH) in each of a first EPDCCH Physical Resource Block (PRB) set and a second EPDCCH PRB set, and transmits reception acknowledgement for each of the EPDCCHs, wherein a resource index for transmitting the reception acknowledgement for each of the EPDCCHs is differently determined depending on at least one of a type of each of the EPDCCH PRB sets, whether or not the EPDCCH PRB sets include the same number of PRB pairs, and whether or not the EPDCCH PRB sets overlap each other.

The first and second aspects of the present invention may include the following details.

The method according to claim 1, wherein, when the first and second EPDCCH PRB sets are for transmission of a distributed (localized) EPDCCH, and the number of PRB pairs included in the first EPDCCH PRB set is different from the number of PRB pairs included in the second EPDCCH PRB set, the resource index for transmitting the reception acknowledgement for the EPDCCH of one of the first and second EPDCCH PRB sets may be determined in consideration of a PRB pair ratio between the first and second EPDCCH PRB sets, the one of the first and second EPDCCH PRB sets including a smaller number of PRB pairs than the other one.

The PRB pair ratio may be a ratio of the number of PRB pairs of the other one of the first and second EPDCCH PRB sets to the number of PRB pairs of the one of the first and second EPDCCH PRB sets having the smaller number of PRB pairs.

The first EPDCCH PRB set and the second EPDCCH PRB set may include PRB pairs overlapping each other.

The resource index for transmitting the reception acknowledgement for the EPDCCH of the one of the first and second EPDCCH PRB sets having the smaller number of PRB pairs, $n_{PUCCH\text{-}DECCE}^{(1)}$, may be determined by the following equation $n_{PUCCH\text{-}DECCE}^{(1)} = N_{PUCCH}^{(1)} + T \times n_{DECCE\text{-}set2}$, wherein $N_{PUCCH}^{(1)}$ may denote a starting point of Physical Uplink Control Channel (PUCCH) resource indexes and has a value delivered through higher layer signaling, T may denote a value obtained by dividing the number of PRB pairs of the other one of the first and second EPDCCH PRB sets by the number of PRB pairs of the one of the first and second EPDCCH PRB sets having the smaller number of PRB pairs, and $n_{DECCE\text{-}set2}$ may denote a lowest Enhanced Control Channel Element (ECCE) index of the one of the first and second EPDCCH PRB sets having the smaller number of PRB pairs.

The resource index for transmitting the reception acknowledgement for the EPDCCH of the one of the first and second EPDCCH PRB sets including the smaller number of PRB pairs, $n_{PUCCH\text{-}DECCE}^{(1)}$, may be determined by the following equation $n_{PUCCH\text{-}DECCE}^{(1)} = N_{PUCCH}^{(1)} + T \times n_{DECCE\text{-}set2} + X$, wherein, $N_{PUCCH}^{(1)}$ may denote a starting point of Physical Uplink Control Channel (PUCCH) resource indexes and has a value delivered through higher layer signaling, T may denote a value obtained by diving the number of PRB pairs of the other one of the first and second EPDCCH PRB sets by the number of PRB pairs of the one of the first and second EPDCCH PRB sets having the smaller number of PRB pairs, X is a lowest index of the PRB pairs, and $n_{DECCE\text{-}set2}$ may denote a lowest Enhanced Control Channel Element (ECCE) index of the one of the first and second EPDCCH PRB sets having the smaller number of PRB pairs.

When the first and second EPDCCH PRB sets are for transmission of a localized EPDCCH and transmission of a distributed EPDCCH, respectively, and the first EPDCCH PRB set is a subset of the second EPDCCH PRB set, an ECCE index in the first EPDCCH PRB set may be replaced with an ECCE index given when the first EPDCCH PRB set has the same number of PRB pairs as the second EPDCCH PRB set.

When the first and second EPDCCH PRB sets are for transmission of a localized EPDCCH and transmission of a distributed EPDCCH, respectively, and the first EPDCCH PRB set is a subset of the second EPDCCH PRB set, the resource index for transmitting the reception acknowledgement for the EPDCCH of the first EPDCCH PRB set, $n_{PUCCH\text{-}LECCE}^{(1)}$, may be determined by the following equation $$n_{PUCCH-LECCE}^{(1)} = N_{PUCCH}^{(1)} + N \cdot n' + \left\lfloor \frac{n_{LECCE}}{d} \right\rfloor + T_{offset},$$

wherein the resource index for transmitting the reception acknowledgement for the EPDCCH of the second EPDCCH PRB set, $n_{PUCCH\text{-}DECCE}^{(1)}$, may be determined by the following equation $n_{PUCCH\text{-}DECCE}^{(1)} = N_{PUCCH}^{(1)} + n_{DECCE}$; wherein $N_{PUCCH}^{(1)}$ may denote a starting point of Physical Uplink Control Channel (PUCCH) resource indexes and has a value delivered through higher layer signaling, $n_{DECCE}$ and $n_{LECCE}$ respectively denote a lowest ECCE index for the distributed EPDCCH and a lowest ECCE index for the localized EPDCCH, N may denote the number of PRB pairs, $n'=n_{LECCE}$ mod d may denote an antenna port index, d may denote the number of ECCEs per PRB pair, and $T_{offset}$ may denote an offset value for compensating for a difference between PRB pair indexes.

When the first and second EPDCCH PRB sets are for transmission of a localized EPDCCH and transmission of a distributed EPDCCH, respectively, and the second EPDCCH PRB set is a subset of the first EPDCCH PRB set, an ECCE index in the second EPDCCH PRB set may be changed to an ECCE index in the first EPDCCH PRB set including the same Enhanced Resource Element Group (EREG) as the second EPDCCH PRB set in determining the resource index for transmitting the reception acknowledgement for the EPDCCH of the second EPDCCH PRB set.

When the first and second EPDCCH PRB sets are for transmission of a localized EPDCCH and transmission of a distributed EPDCCH, respectively, and the second EPDCCH PRB set is a subset of the first EPDCCH PRB set, the resource index for transmitting the reception acknowledgement for the EPDCCH of the first EPDCCH PRB set, $n_{PUCCH\text{-}LECCE}^{(1)}$, may be determined by the following equation $$n_{PUCCH-LECCE}^{(1)} = N_{PUCCH}^{(1)} + \left\lfloor \frac{n_{ECCE}}{d} \right\rfloor \times d + k_P,$$

wherein the resource index for transmitting the reception acknowledgement for the EPDCCH of the second EPDCCH PRB set, $n_{PUCCH\text{-}DECCE}^{(1)}$, may be determined by the following equation $$n_{PUCCH-DECCE}^{(1)} = N_{PUCCH}^{(1)} + d \cdot \text{mod}(n_{ECCE}, N_D) + \left\lfloor \frac{n_{ECCE}}{N_D} \right\rfloor$$

wherein $N_{PUCCH}^{(1)}$ may denote a starting point of Physical Uplink Control Channel (PUCCH) resource indexes and has a value delivered through higher layer signaling, $n_{DECCE}$ and $n_{LECCE}$ respectively denote a lowest ECCE index for the distributed EPDCCH and a lowest ECCE index for the localized EPDCCH, $N_D$ may denote the number of PRB pairs for the distributed EPDCCH, $k_p$ may denote a value related to an antenna port, and d may denote the number of ECCEs in a PRB pair.

When d=4 in a normal cyclic prefix, $k_p$ may be given as $k_p=p-107$, $p \in \{107,108,109,110\}$.

The first and second EPDCCH PRB sets may be indicated by higher layer signaling.

Advantageous Effects

According to embodiments of the present invention, resources for reception acknowledgement for a plurality of EPDCCH sets may be selected without collision therebetween.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 9 illustrates a PUCCH channel using block spreading;
FIG. 10 illustrates a method for transmitting UL control information on a PUSCH;
FIGS. 11 to 16 illustrate collision between PUCCH resource indexes and a solution according to an embodiment of the present invention.

BEST MODE

Figure 1:
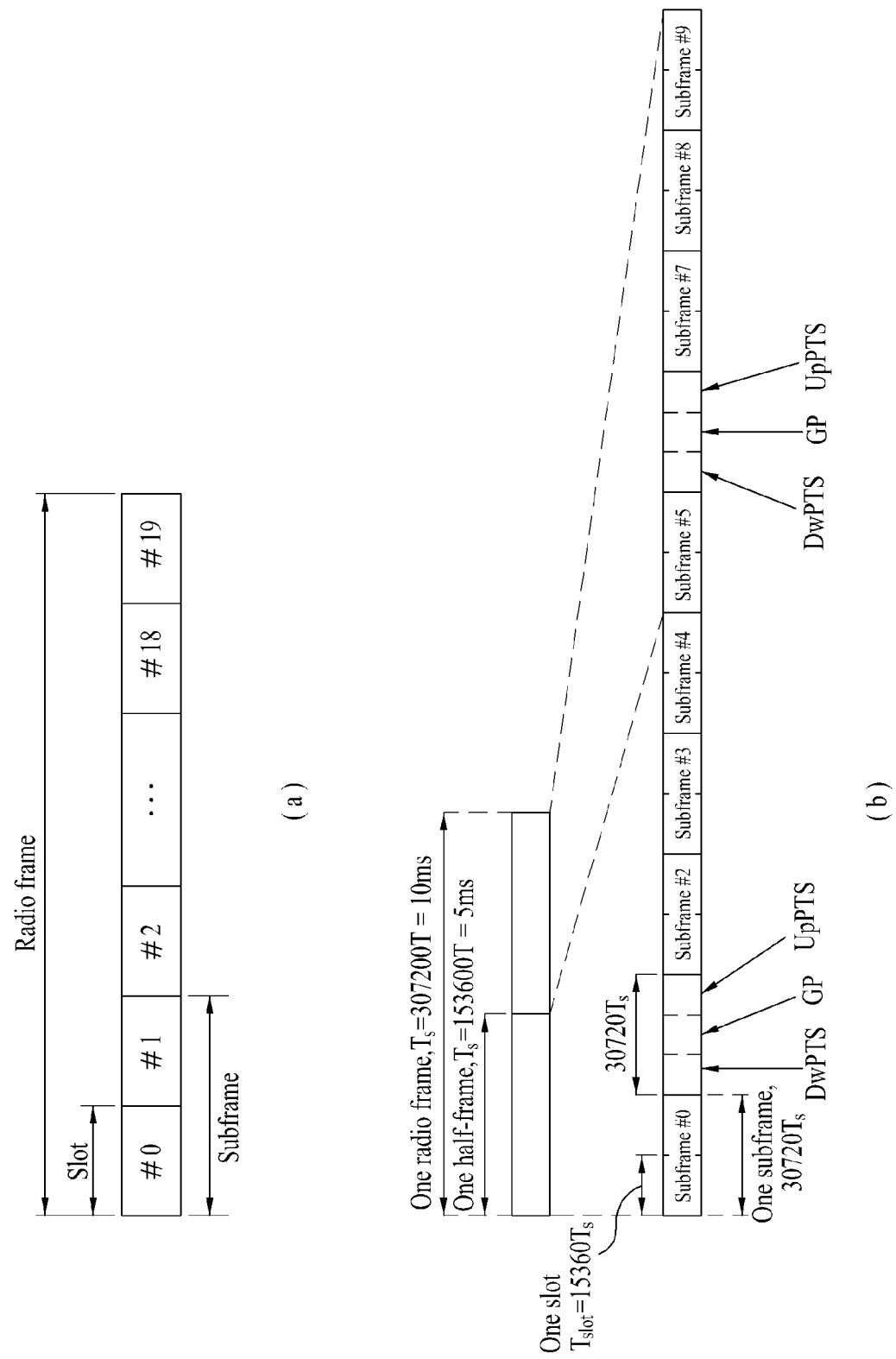
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
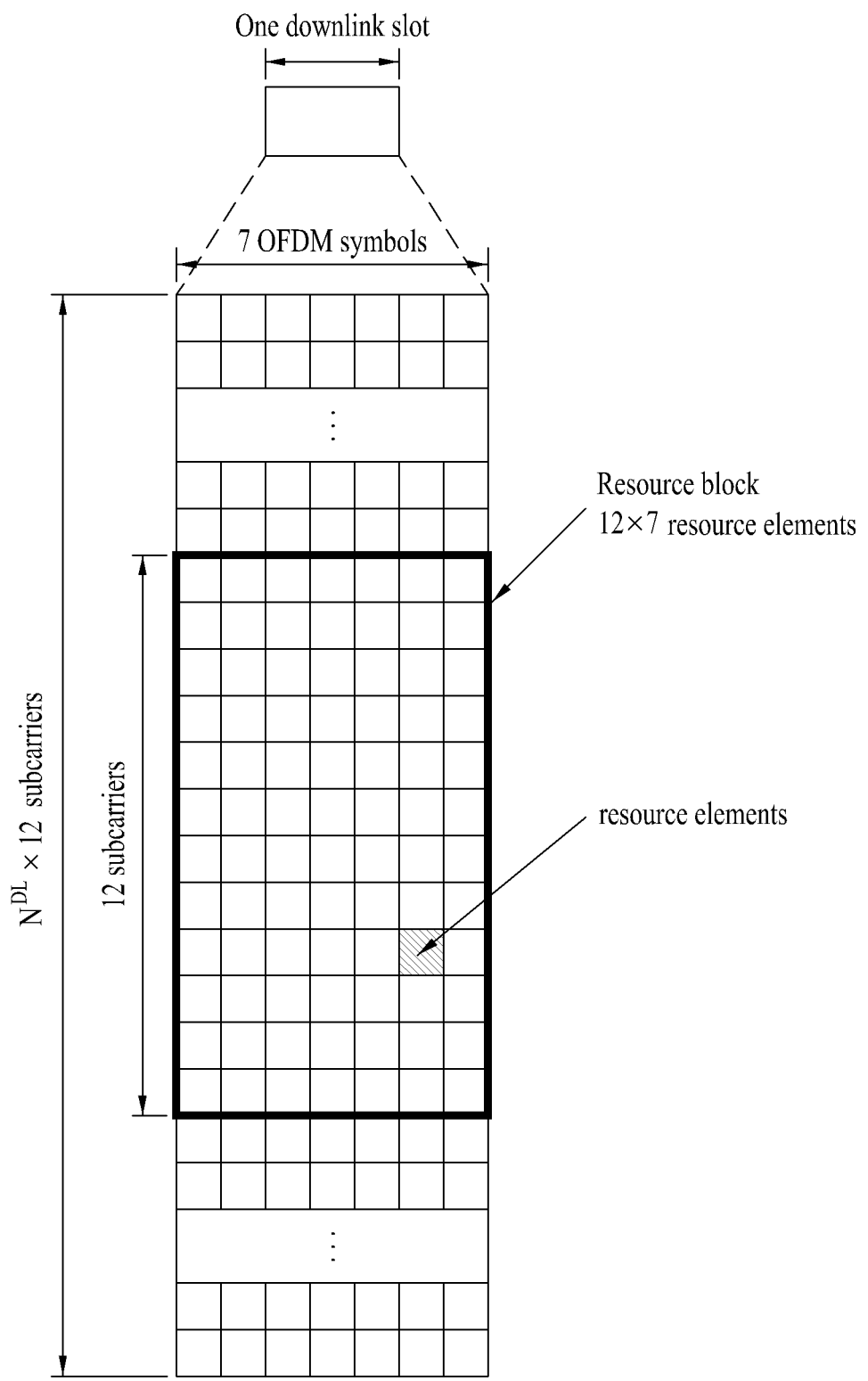
FIG. 2 is a diagram illustrating a resource grid for one downlink (DL) slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number $N^{DL}$ of RBs included in a downlink slot depends on a DL transmission bandwidth. A UL slot may have the same structure as a DL slot.

Figure 3:
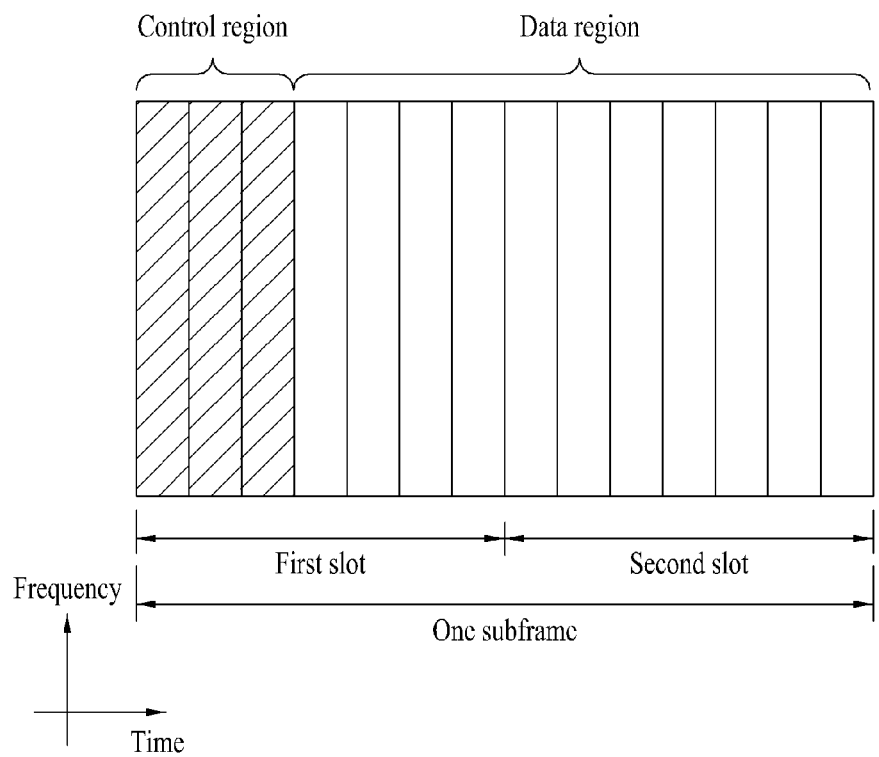
FIG. 3 is a diagram illustrating a DL subframe structure.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling, information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
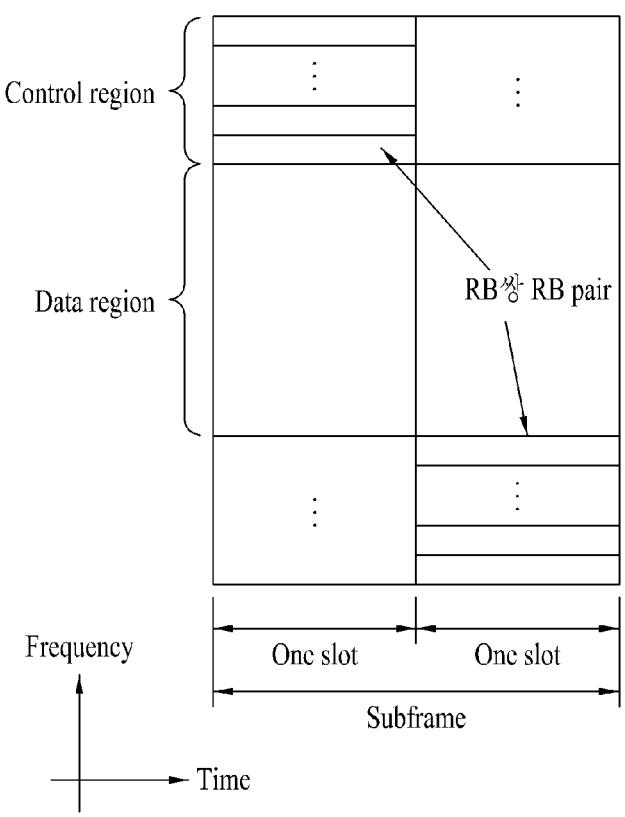
FIG. 4 illustrates an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

PUCCH

UL control information (UCI) transmitted over a PUCCH may include a scheduling request (SR), HARQ ACK/NACK information, and DL channel measurement information.

The HARQ ACK/NACK information may be generated depending on whether decoding of a DL data packet on a PDSCH is successful. In a conventional wireless communication system, 1 bit is transmitted as ACK/NACK information for DL single codeword transmission and 2 bits are transmitted as ACK/NACK information DL 2-codeword transmission.

The channel measurement information may refer to feedback information associated with a multiple input multiple output (MIMO) scheme and include a channel quality indicator (CQI), a precoding matrix index (PMI), and a rank indicator (RI). The channel measurement information may be collectively referred to as CQI. 20 bits may be used per subframe to transmit CQI.

The PUCCH may be demodulated using a binary phase shift keying (BPSK) scheme and a quadrature phase shift keying (QPSK) scheme. Control information of a plurality of UEs may be transmitted over the PUCCH. When code division multiplexing (CDM) is performed to distinguish between signals of UEs, constant amplitude zero autocorrelation (CAZAC) with a length of 12 is mainly used. The CAZAC sequence has characteristics of maintaining a constant amplitude in the time domain and frequency domain and thus is suitable for reduction in peak-to-average power ratio (PAPR) or cubic metric (CM) of a UE to increase coverage. In addition, ACK/NACK information in response to DL data transmitted over a PUCCH is covered using an orthogonal sequence or orthogonal cover (OC).

In addition, control information transmitted on a PUCCH may be distinguished using cyclically shifted sequences having different cyclic shift (CS) values. A cyclically shifted sequence may be generated by cyclically shifting a base sequence by a specific CS amount. The specific CS amount is indicated by a CS index. The number of available CSs may change depending on channel delay spread. Various types of sequences may be used as the base sequence and the aforementioned CAZAC sequence is an example of the base sequence.

In addition, the amount of control information that a UE can transmit in a subframe may be determined depending on the number of SC-FDMA symbols (i.e., SC-FDMA symbols except for an SC-FDMA symbol used to transmit a reference signal (RS) for coherent detection of PUCCH) that can be used to transmit the control information.

In 3GPP LTE, a PUCCH is defined in seven different formats according to transmitted control information, a modulation scheme and the amount of control information. Attributes of transmitted uplink control information (UCI) for each PUCCH format may be summarized as shown in Table 1.

TABLE 1

| PUCCH format | Modulation Scheme | Number of bits per subframe | Usage | Etc. |
|---|---|---|---|---|
| 1 | N/A | N/A | SR (Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

PUCCH format 1 is used to transmit an SR only. When the SR is transmitted alone, an unmodulated waveform is applied, which will be described in detail below.

PUCCH format 1a or 1b is used for transmission of HARQ ACK/NACK. When only HARQ ACK/NACK is transmitted in a subframe, PUCCH format 1a or 1b may be used. Alternatively, HARQ ACK/NACK and SR may be transmitted in the same subframe using PUCCH format 1a or 1b.

PUCCH format 2 is used for transmission of CQI, whereas PUCCH format 2a or 2b is used for transmission of CQI and HARQ ACK/NACK. For the extended CP, PUCCH format 2 may be used for transmission of CQI and HARQ ACK/NACK.

Figure 5:
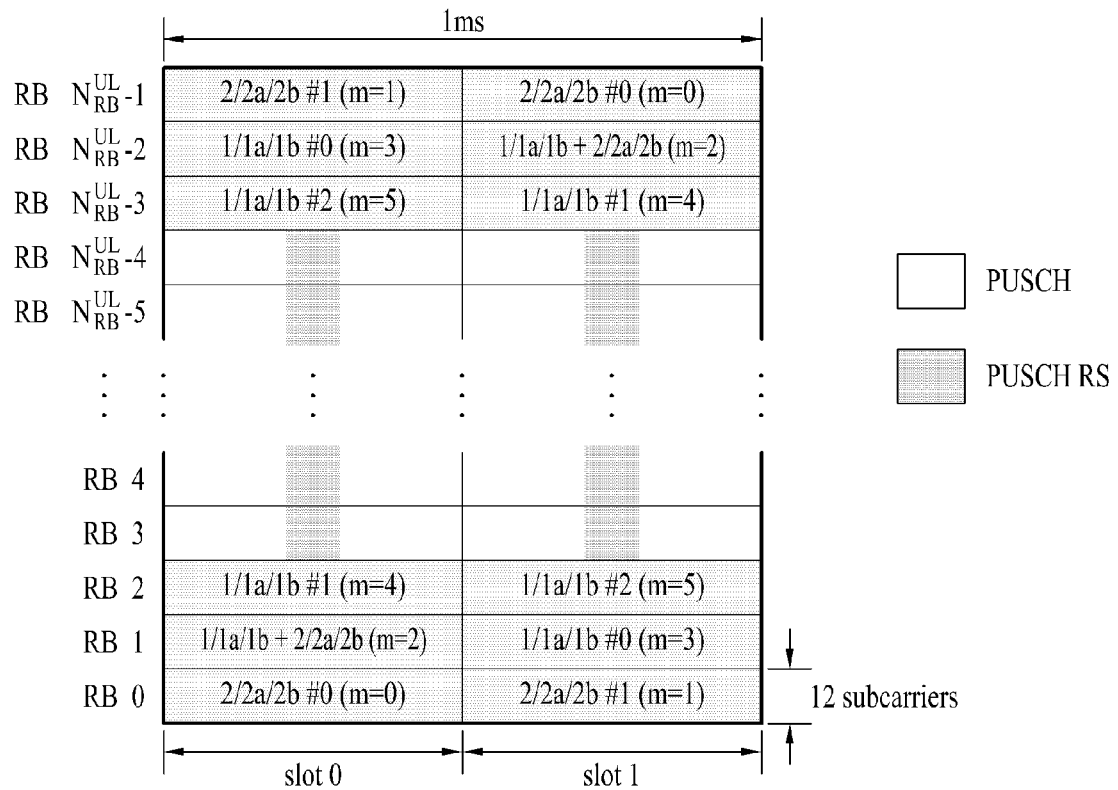
FIG. 5 illustrates mapping of PUCCH formats in a UL physical resource block.

FIG. 5 illustrates mapping of PUCCH formats to PUCCH regions in UL physical resource blocks. In FIG. 5, $N_{PUCCI}^{(2)}$ denotes the number of resource blocks on UL, and 0, 1, . . . , $N_{PUCCI}^{(2)}-1$ represent physical resource block numbers. Basically, a PUCCH is mapped to opposite edges of a UL frequency block. As illustrated in FIG. 5, PUCCH formats 2/2a/2b are mapped to PUCCH regions indicated by m=0 and 1, which may represent that PUCCH formats 2/2a/2b are mapped to resource blocks positioned at the band-edges. In addition, PUCCH formats 2/2a/2b and PUCCH formats 1/1a/1b may be mixed and mapped to a PUCCH region indicated by m=2. PUCCH formats 1/1a/1b may be mapped to PUCCH regions indicated by m=3, 4, and 5. The number ($N_{PUCC}^{(1)}$) of available PUCCH RBs may be indicated to UEs in a cell by the PUCCH format 2/2a/2b, through broadcast signaling.

PUCCH Resources

A BS allocates a PUCCH resource for UCI transmission to a UE in an implicit or explicit manner through higher layer signaling.

For ACK/NACK, a plurality of PUCCH resource candidates may be set for the UE by a higher layer. Of the PUCCH resource candidates, a PUCCH resource to be used by the UE may be determined in an implicit manner. For example, the UE may receive a PDSCH from the BS and transmit ACK/NACK for a corresponding data unit through a PUCCH resource implicitly determined by a PDCCH resource that carries scheduling information about the PDSCH.

Figure 6:
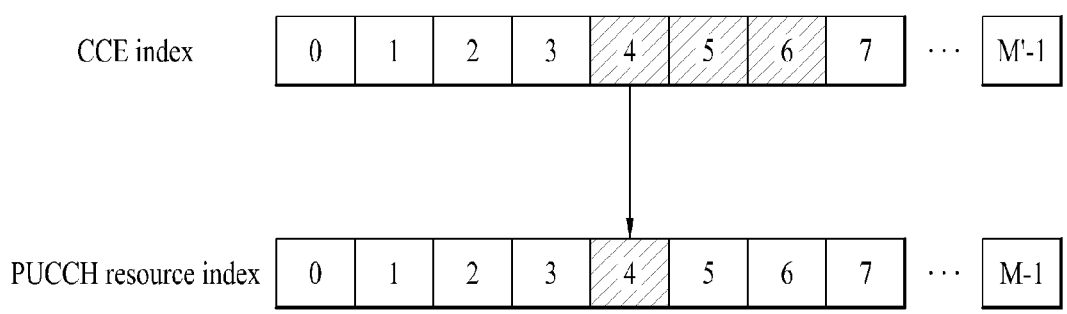
FIG. 6 illustrates an example of determining PUCCH resources for ACK/NACK.

FIG. 6 illustrates an example of determining PUCCH resources for ACK/NACK.

In LTE, a PUCCH resource for ACK/NACK information is not pre-allocated to UEs. Rather, PUCCH resources are used separately by a plurality of UEs within a cell at each time. Specifically, a PUCCH resource that a UE uses to transmit ACK/NACK is implicitly determined based on a PDCCH carrying scheduling information about a PDSCH that delivers the DL data. An entire area in which a PDCCH is transmitted in a DL subframe includes a plurality of control channel elements (CCEs) and a PDCCH transmitted to a UE includes one or more CCEs. A CCE includes a plurality of (e.g., 9) resource element groups (REGs). One REG includes four resource elements (REs) that neighbors each other with an RS excluded. The UE transmits ACK/NACK through an implicit PUCCH resource that is derived or calculated according to a function of a specific CCE index (e.g., the first or lowest CCE index) from among the CCE indexes included in a PDCCH received by the UE.

Referring to FIG. 6, each PUCCH resource index corresponds to a PUCCH resource for ACK/NACK. As illustrated in FIG. 6, suppose that scheduling information about the PDSCH is transmitted to the UE on a PDCCH including CCEs #4, #5 and #6. The UE transmits ACK/NACK to a BS on a PUCCH, for example, PUCCH #4 that is derived or calculated from the lowest CCE index 4 constituting the PDCCH. FIG. 6 illustrates a case in which up to M' CCEs are present in the DL and up to M PUCCHs are present in UL. M may be equal to M', but it is also possible to set M to be different from M' and to map CCEs to PUCCHs in an overlapping manner.

For example, a PUCCH resource index may be determined by the following equation.

$$n_{PUCCH}^{(1)} + n_{CCE} + N_{PUCCH}^{(1)} \qquad \text{Equation 1}$$

Herein, $n_{PUCCH}^{(1)}$ denotes the index of a PUCCH resource for transmission of ACK/NACK, and $N_{PUCCH}^{(1)}$ denotes a signaling value received from a higher layer. $n_{CCE}$ may denote the lowest index of the CCE indexes used for transmission of a PDCCH.

PUCCH Channel Structure

PUCCH formats 1a/1b will be described first below.

In PUCCH formats 1a/1b, a symbol modulated using BPSK or QPSK is multiplied by a CAZAC sequence having a length of 12. For example, multiplying a modulation symbol d(0) by a CAZAC sequence r(n) (n=0, 1, 2, . . . , N−1) having a length of N gives a result of y(0), y(1), y(2), . . . , y(N−1). Symbols y(0), y(1), y(2), . . . , and y(N−1) may be called a block of symbols. After the modulation symbol is multiplied by the CAZAC sequence, block-wise-spreading using an orthogonal sequence is applied.

A Hadamard sequence with a length of 4 is employed for general ACK/NACK information, while a discrete Fourier transform (DFT) with a length of 3 is employed for shortened ACK/NACK information and a reference signal. For an extended CP, a Hadamard sequence with a length of 2 is employed for a reference signal.

Figure 7:
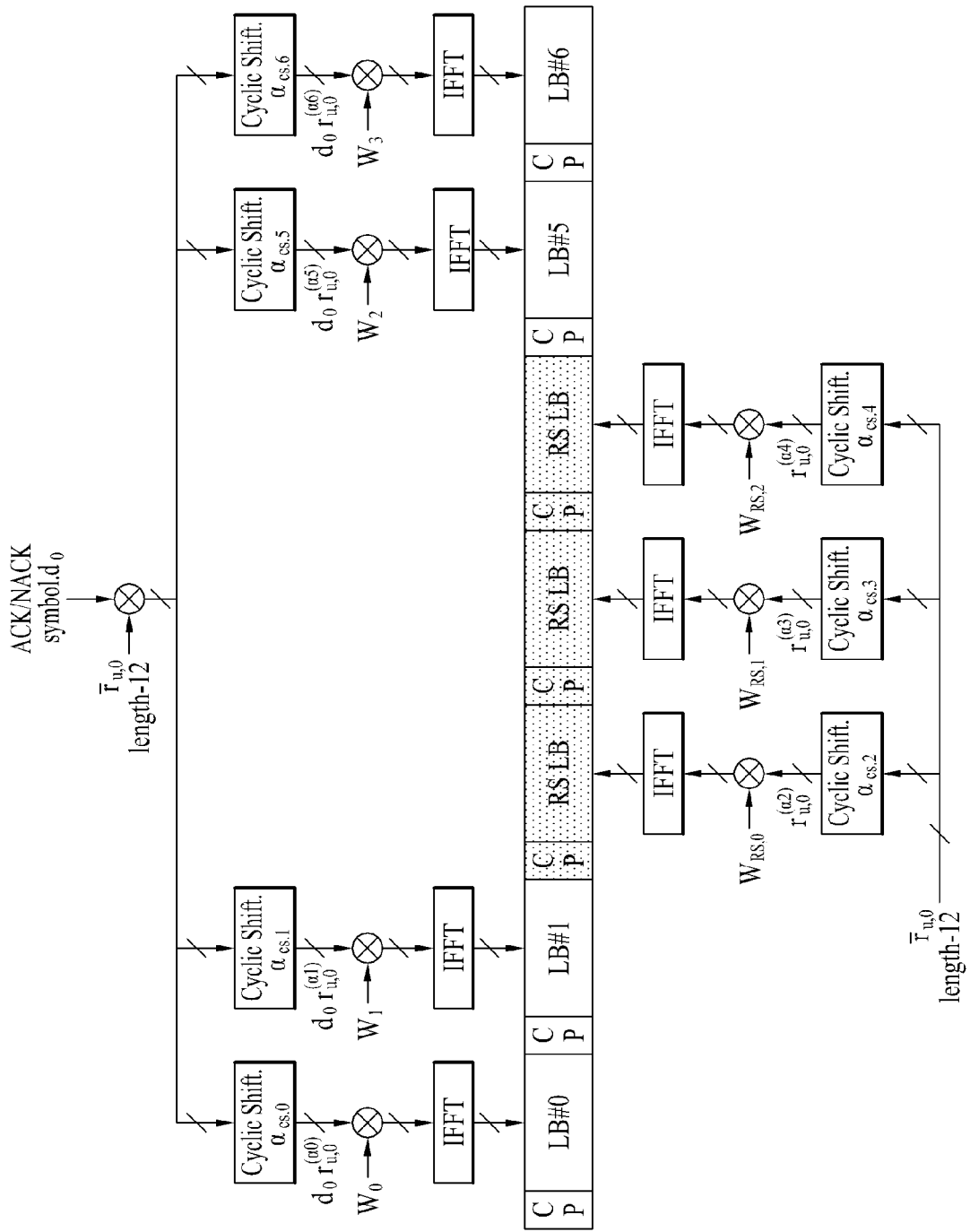
FIG. 7 illustrates an ACK/NACK channel structure for a normal cyclic prefix (CP)

FIG. 7 illustrates an ACK/NACK channel structure for a normal CP. FIG. 7 exemplarily shows the structure of a PUCCH channel for transmission of HARQ ACK/NACK without CQI. Three consecutive SC-FDMA symbols in the middle of seven SC-FDMA symbols carry RSs and the remaining four SC-FDMA symbols carry ACK/NACK signals. For the extended CP, two consecutive symbols in the middle of SC-FDMA symbols may carry RSs. The number and positions of symbols used for an RS may change depending on a control channel, and the number and positions of symbols used for a ACK/NACK signal associated with the RS may change depending on the number and positions of symbols used for the RS.

1-bit ACK/NACK information and 2-bit ACK/NACK information (which is unscrambled) may be represented in a HARQ ACK/NACK modulation symbol using BPSK and QPSK, respectively. ACK may be encoded as 1, and NACK may be encoded as 0.

When a control signal is transmitted within an allocated band, 2-dimensional spreading is applied to enhance multiplexing capacity. That is, frequency domain spreading and time domain spreading are simultaneously applied to increase the number of UEs or control channels that can be multiplexed. To spread an ACK/NACK signal in the frequency domain, a frequency domain sequence is used as a basic sequence. A Zadoff-Chu (ZC) sequence, one of CAZAC sequences, may be used as the frequency domain sequence. For example, different cyclic shifts (CSs) may be applied to a ZC sequence, which is the basic sequence, to multiplex different UEs or different control channels. The number of CS resources supported by SC-FDMA symbols for PUCCH RBs for HARQ ACK/NACK transmission is set by a cell-specific higher-layer signaling parameter ($\Delta_{shift}^{PUCCH}$), and $\Delta_{shift}^{PUCCH} \in \{1, 2, 3\}$ represents 12, 6 or 4 shifts.

A frequency-domain-spread ACK/NACK signal is spread in the time domain using an orthogonal spreading code. As the orthogonal spreading code, a Walsh-Hadamard sequence or a DFT sequence may be used. For example, the ACK/NACK signal may be spread using orthogonal sequences (w0, w1, w2, w3) with a length of 4 for four symbols. In addition, the RS may also be spread using an orthogonal sequence with a length of 3 or 2, which is referred to as orthogonal covering (OC).

A plurality of UEs may be multiplexed in a code division multiplexing (CDM) scheme using CS resources in the frequency domain and OC resources in the time domain as described above. That is, ACK/NACK information and RSs of a large number of UEs may be multiplexed on the same PUCCH RB.

In time domain spreading CDM, the number of supported spreading codes for the ACK/NACK information is restricted by the number of RS symbols. That is, the number of SC-FDMA symbols for RS transmission is smaller than the number of SC-FDMA symbols for ACK/NACK transmission, and therefore multiplexing capacity of an RS is lower than multiplexing capacity of the ACK/NACK information. For example, in the case of a normal CP, the ACK/NACK information may be transmitted in four symbols, but three orthogonal spreading codes are used rather than four orthogonal spreading codes for the ACK/NACK information. This is because the number of RS transmission symbols is limited to three and thus only three orthogonal spreading codes can be used for the RS.

Examples of an orthogonal sequence used in spreading ACK/NACK information are shown in Tables 2 and 3. Table 2 shows a sequence for a symbol having a length of 4 and Table 3 shows a sequence for a symbol having a length of 3. The sequence for the symbol having a length of 4 is used in PUCCH formats 1/1a/1b of a normal subframe configuration. Considering a case in which an SRS is transmitted on the last symbol of the second slot in a subframe configuration, the sequence for the symbol with the length of 4 may be applied to the first slot and shortened PUCCH formats 1/1a/1b of the sequence for the symbol with the length of 3 may be applied to the second slot.

TABLE 2

| Sequence index $n_{oc}^{(\tilde{p})}(n_s)$ | Orthogonal sequence $[w(0) \ldots w(N_{SF}^{PUCCH} - 1)]$ |
| --- | --- |
| 0 | [+1 +1 +1 +1] |
| 1 | [+1 −1 +1 −1] |
| 2 | [+1 −1 −1 +1] |

TABLE 3

| Sequence index $n_{oc}^{(\tilde{p})}(n_s)$ | Orthogonal sequences $[w(0) \ldots w(N_{SF}^{PUCCH}-1)]$ |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

When three symbols are used for RS transmission and four symbols are used for ACK/NACK information transmission in a slot of a subframe of the normal CP, if, for example, six CSs in the frequency domain and three OC resources in the time domain are allowed to be used, HARQ ACK/NACK signals from 18 different UEs may be multiplexed in a PUCCH RB. When two symbols are used for RS transmission and four symbols are used for ACK/NACK information transmission in a slot of a subframe of the extended CP, if, for example, six CSs in the frequency domain and two OC resources in the time domain are allowed to be used, HARQ ACK/NACK signals from 12 different UEs may be multiplexed in a PUCCH RB.

Hereinafter, PUCCH format 1 will be described. A scheduling request (SR) is transmitted by requesting scheduling of the UE or not requesting scheduling of the UE. An SR channel reuses an ACK/NACK channel structure in PUCCH formats 1a/1b and is configured in an on-off keying (OOK) manner based on the design of the ACK/NACK channel. An RS is not transmitted on an SR channel. Thus, a sequence with a length of 7 is used in the case of the normal CP, and a sequence with a length of 6 is used in the case of the extended CP. Different CSs or orthogonal covers may be allocated to an SR and ACK/NACK. That is, in implementing transmission of a positive SR, the UE transmits HARQ ACK/NACK through resources allocated for the SR. In implementing transmission of a negative SR, the UE transmits HARQ ACK/NACK through resources allocated for ACK/NACK.

Hereinafter, PUCCH formats 2/2a/2b will be described. PUCCH formats 2/2a/2b are control channels for transmission of channel measurement feedback (CQI, PMI and RI).

A report period of the channel measurement feedback (hereinafter, referred to as CQI information) and a frequency unit (or frequency resolution) subject to measurement may be controlled by a BS. Periodic and aperiodic CQI reports may be supported in the time domain. PUCCH format 2 may be used only for the periodic report and a PUSCH may be used for the aperiodic report. In the case of the aperiodic report, the BS may instruct the UE to transmit an individual CQI report on a resource scheduled for UL data transmission.

Figure 8:
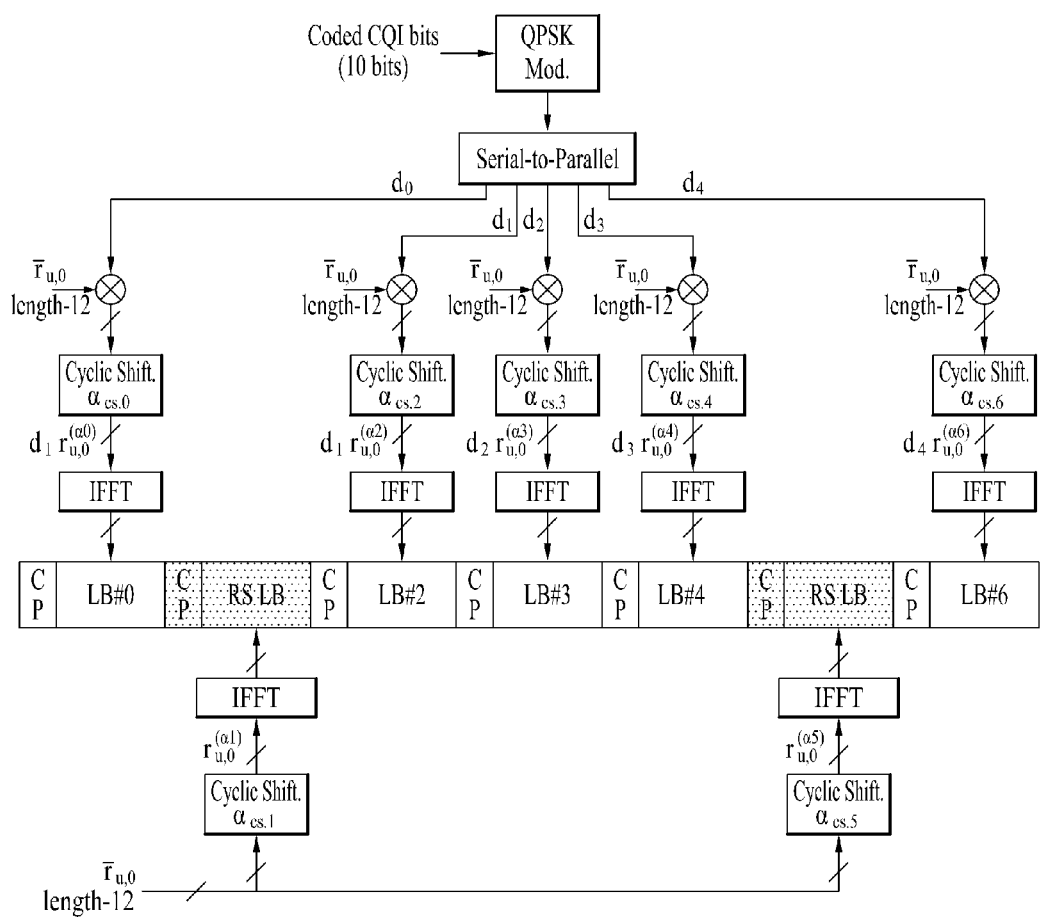
FIG. 8 illustrates a CQI channel structure for a normal CP.

FIG. 8 illustrates a CQI channel structure for a normal CR SC-FDMA symbols #1 and #5 (second and sixth symbols) from among SC-FDMA symbols #0 to #6 of a slot may be used to transmit a demodulation reference signal (DMRS), and CQI information may be transmitted in the remaining SC-FDMA symbols. In the case of an extended CP, one SC-FDMA symbol (SC-FDMA symbol #3) is used to transmit the DMRS.

In PUCCH formats 2/2a/2b, modulation by a CAZAC sequence is supported, and a symbol modulated according to QPSK is multiplied by a CAZAC sequence with a length of 12. The CS of the sequence is changed between symbols and between slots. OC is used for the DMRS.

Of the seven SC-FDMA symbols included in a slot, two SC-FDMA symbols spaced apart by an interval of three SC-FDMA symbols carry DMRSs and the remaining five SC-FDMA symbols carry CQI information. Two RSs are used in a slot in order to support a high-speed UE. A UE is identified using a CS sequence. CQI information symbols are modulated into SC-FDMA symbols and transmitted. An SC-FDMA symbol includes a sequence. That is, a UE modulates CQI into each sequence and transmits the sequences.

The number of symbols that can be transmitted in a TTI is 10 and QPSK is determined for modulation of CQI information. When QPSK mapping is employed for the SC-FDMA symbols, an SC-FDMA symbol may carry a 2-bit CQI value and thus a slot may carry a 10-bit CQI value. Accordingly, a maximum of a 20-bit CQI value may be carried in a subframe. To spread the CQI information in the frequency domain, a frequency domain spreading code is used.

A CAZAC sequence with a length of 12 (e.g., a ZC sequence) may be used for the frequency domain spreading code. Control channels may be distinguished from each other using CAZAC sequences having different CS values. The frequency-domain-spread CQI information is subjected to IFFT.

12 different UEs may be orthogonally multiplexed in the same PUCCH RB using 12 equally spaced CSs. For the normal CP, a DMRS sequence on SC-FDMA symbols #1 and #5 (SC-FDMA symbols #3 for the extended CP) is similar to a CQI signal sequence in the frequency domain, but the DMRS sequence is not modulated as in the case of the CQI information. A UE may be semi-statically set by higher layer signaling so as to periodically report different CQI, PMI and RI types on a PUCCH resource indicated by a PUCCH resource index $n_{PUCCH}^{(2)}$. Herein, the PUCCH resource index $N_{PUCCH}^{(2)}$ is information indicating a PUCCH region and a CS value used for PUCCH format 2/2a/2b transmission.

Hereinafter, an enhanced-PUCCH (e-PUCCH) format will be described. The e-PUCCH format may correspond to PUCCH format 3 in LTE-A. Block spreading may be applied to ACK/NACK transmission using PUCCH format 3.

Block spreading is a method of modulating a control signal using SC-FDMA, which is distinguished from the PUCCH format 1 or 2 series. As shown in FIG. 9, a symbol sequence may be spread in the time domain using an orthogonal cover code (OCC) and transmitted. Control signals of a plurality UEs may be multiplexed in the same RB using the OCC. In the case of PUCCH format 2 described above, a symbol sequence is transmitted in the time domain and control signals of multiple UEs are multiplexed using a CS of a CAZAC sequence. On the other hand, in the case of a block spreading-based PUCCH format (e.g., PUCCH format 3), a symbol sequence is transmitted in the frequency domain and control signals of multiple UEs are multiplexed through the time domain spreading based on an OCC.

FIG. 9(a) illustrates an example of generation and transmission of four SC-FDMA symbols (i.e., data portions) using an OCC with a length of 4 (or spreading factor (SF)=4) in a symbol sequence during one slot. In this case, three RS symbols (i.e., RS portions) may be used in one slot.

FIG. 9(b) illustrates an example of generation and transmission of five SC-FDMA symbols (i.e., data portions) using an OCC with a length of 5 (or SF=5) in a symbol sequence during one slot. In this case, two RS symbols may be used in one slot.

In the examples of FIG. 9, the RS symbols may be generated from a CAZAC sequence to which a specific CS value is applied, and a predetermined OCC may be applied to (or multiplied by) a plurality of RS symbols and transmitted. If 12 modulation symbols are used per OFDM symbol (or SC-FDMA symbol) and each modulation symbol is generated according to QPSK in the examples of FIG. 9, the maximum number of bits that can be transmitted in a slot is 12×2=24. Thus, the total number of bits that can be transmitted in two slots is 48. When the PUCCH channel structure employing the block spreading scheme is used, it may be possible to transmit extended control information compared to the case of existing PUCCH formats 1 and 2.

ACK/NACK Multiplexing Scheme

In ACK/NACK multiplexing, content of an ACK/NACK to a plurality of data units may be identified by a combination of an ACK/NACK unit actually used for ACK/NACK transmission and one of QPSK-modulated symbols. For example, suppose that an ACK/NACK unit carries 2-bit information and receives a maximum of two data units. Herein, it is assumed that a HARQ ACK/NACK for each of the received data units is represented by an ACK/NACK bit. In this case, a transmitter that has transmitted data may identify the ACK/NACK results as shown below in Table 4.

TABLE 4

| HARQ-ACK(0), HARQ-ACK(1) | $n_{PUCCH}^{(1)}$ | b(0), b(1) |
| --- | --- | --- |
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In Table 4, HARQ-ACK(i) (i=0, 1) represents an ACK/NACK result with respect to data unit i. Since a maximum of two data units (data unit 0 and data unit 1) is assumed to be received as described above, an ACK/NACK result with respect to data unit 0 is represented as HARQ-ACK(0) and an ACK/NACK result with respect to data unit 1 is represented as HARQ-ACK(1) in Table 4. Referring to Table 4, DTX (Discontinuous Transmission) indicates that the data unit corresponding to HARQ-ACK(i) is not transmitted or that a receiver cannot detect presence of the data unit corresponding to HARQ-ACK(i). In addition, $n_{PUCCH,X}^{(1)}$ denotes an ACK/NACK unit actually used for ACK/NACK transmission. When there is a maximum of two ACK/NACK units, the ACK/NACK units may be represented as $n_{PUCCH,0}^{(1)}$ and $n_{PUCCH,1}^{(1)}$. In addition, b(0), b(1) denote two bits transmitted by selected ACK/NACK units. Modulation symbols transmitted through ACK/NACK units are determined depending on bits of b(0) and b(1).

For example, when the receiver successfully receives and decodes two data units (as indicated by ACK, ACK in Table 4), the receiver transmits two bits (1, 1) using the ACK/NACK unit $n_{PUCCH,1}^{(1)}$. If the receiver fails to decode (or detect) the first data unit (i.e., data unit 0 corresponding to HARQ-ACK(0)) of the two received data units and successfully decodes the second data unit (i.e. data unit 1 corresponding to HARQ-ACK(1)) (as indicated by NACK/DTX, ACK in Table 4), the receiver transmits two bits (0, 0) using the ACK/NACK unit $n_{PUCCH,1}^{(1)}$.

As such, it is possible to transmit ACK/NACK information about a plurality of data units using one ACK/NACK unit by linking or mapping a combination of a selected ACK/NACK unit and actual bits of the transmitted ACK/NACK unit (i.e., a combination of selected $n_{PUCCH,0}^{(1)}$ or $n_{PUCCH,1}^{(1)}$ and b(0), b(1) in Table 4) to the content of actual ACK/NACK, ACK/NACK multiplexing for more than two data units may be readily implemented by extending the principle of the above-described ACK/NACK multiplexing.

In the ACK/NACK multiplexing scheme described above, NACK and DTX may not be discriminated from each other when at least one ACK is present for each data unit (that is, NACK and DTX may be coupled as NACK/DTX as shown in Table 4). This is because all ACK/NACK states (i.e., ACK/NACK hypotheses) that may be generated when NACK and DTX are discriminated from each other cannot be represented by only combinations of ACK/NACK units and QPSK-modulated symbols. When ACK is not present for any data unit (i.e., when only NACK or DTX is present for all data units), a single definite case of NACK indicating that only one of HARQ-ACKs(i) is a definite NACK (i.e., NACK discriminated from DTX) may be defined. In this case, an ACK/NACK unit corresponding to a data unit for a definite NACK may be reserved for transmission of a plurality of ACK/NACK signals.

PUCCH Piggyback

In UL transmission in a legacy 3GPP LTE system (e.g., a Release-8 system), single carrier transmission with good cubic metric (CM) property or a good peak-to-average power ratio (PAPR), which affects performance of a power amplifier, is maintained to effectively utilize the power amplifier of the UE. That is, single carrier characteristics of data to be transmitted may be maintained through DFT-precoding in the case of PUSCH transmission in the legacy LTE system. In the case of PUCCH transmission, single carrier characteristics may be maintained by carrying information on a sequence having single carrier characteristics. However, if DFT-precoded data is non-continuously assigned on a frequency axis, or if PUSCH and PUCCH are simultaneously transmitted, such single carrier characteristics are not maintained.

Thus, when PUSCH transmission takes place in the same subframe as that for PUCCH transmission as illustrated in FIG. 10, uplink control information (UCI) to be transmitted on a PUCCH may be piggybacked together with data over a PUSCH in order to maintain the single carrier characteristics.

As described above, the legacy LTE UE cannot simultaneously transmit the PUCCH and the PUSCH, and thus the UE multiplexes UCI (CQI/PMI, HARQ-ACK, RI, etc.) in a PUSCH region in a subframe in which the PUSCH is transmitted. For example, when CQI and/or PMI is transmitted in a subframe assigned for PUSCH transmission, UL-SCH data and CQI/PMI may be multiplexed prior to DFT-spreading, such that control information and data are simultaneously transmitted. In this case, rate matching is performed for the UL-SCH data in consideration of CQI/PMI resources. In addition, control information such as HARQ ACK and RI may be multiplexed in the PUSCH region by puncturing the UL-SCH data.

Reference Signal (RS)

In transmitting packets in a wireless communication system, the packets are transmitted over a radio channel and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into an UL RS and a DL RS. In a current LTE system, the UL RS includes:

i) a demodulation-reference signal (DM-RS) for channel estimation for coherent demodulation of information transmitted over a PUSCH and a PUCCH, and ii) a sounding reference signal (SRS) for measuring UL channel quality at frequencies of different networks in the BS.

The DL RS includes:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MBSFN) reference signal transmitted for coherent demodulation of a signal transmitted in an MBSFN mode, and vi) a positioning reference signal used to estimate geographical position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

FIG. 11 is a diagram illustrating a pattern in which CRSs and DRSs defined in a legacy 3GPP LTE system (e.g., Release-8) are mapped onto resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal. CP (FIG. 11(a)) and a length of 12 OFDM symbols for an extended CP (FIG. 11(b)).

FIG. 11 shows locations of RSs on RB pairs in a system in which the BS supports four transmit antennas. In FIG. 11, resource elements (REs) denoted by "0", "1", "2" and "3" represent the locations of the CRSs for antenna port indexes 0, 1, 2 and 3, respectively. In FIG. 11, REs denoted by "D" represent locations of the DMRSs.

Enhanced-PDCCH (EPDCCH)

In an LTE system after Release 11, an enhanced-PDCCH (EPDCCH) which can be transmitted through the existing PDSCH region is considered as a solution to lack of capacity of a PDCCH due to coordinated multi-point (CoMP), multi user-multiple input multiple output (MU-MIMO), and the like and degradation of PDCCH performance due to inter-cell interference. In addition, with the EPDCCH, channel estimation may be performed based on DMRSs contrary to the existing CRS-based PDCCH in order to obtain a pre-coding gain.

EPDCCH transmission may be divided into localized EPDCCH transmission and distributed EPDCCH transmission according to configuration of a physical resource block (PRB) used for EPDCCH transmission. The localized EPDCCH transmission represents the case in which enhanced control channel elements (ECCEs) used in transmitting one DCI neighbor each other in the frequency domain, and may employ specific pre-coding to obtain a beamforming gain. For example, localized EPDCCH transmission may be based on consecutive ECCEs the number of which corresponds to an aggregation level. On the other hand, the distributed EPDCCH transmission represents the case in which an EPDCCH is transmitted on separated PRB pairs in the frequency domain. Distributed EPDCCH transmission has a benefit in terms of frequency diversity. For example, distributed EPDCCH transmission may be based on ECCEs including four EREGs contained in each PRB pair separated in the frequency domain. For the UE, one or two EPDCCH PRB sets may be configured by higher layer signaling, and each EPDCCH PRB set may be intended for one of localized EDPCCH transmission and distributed EPDCCH transmission.

The UE may perform blind decoding as in a legacy LTE/LTE-A system to receive/acquire DCI over an EPDCCH. More specifically, the UE may attempt to decode (or monitor) a set of EPDCCH candidates at each aggregation level, for DCI formats corresponding to set transmission modes. Herein, the set of EPDCCH candidates subjected to monitoring may be referred to as a specific search space for the EPDCCH UE, and the search space may be set/configured for each aggregation level. In addition, the aggregation levels may be {1, 2, 4, 8, 16, 32} according to a type of a subframe, the length of a CP, and the amount of available resources in a PRB pair, which is more or less different from the case of a legacy LTE/LTE-A system.

For a UE having an EPDCCH configured, REs included in a PRB pair set are indexed by EREGs, and the EREGs are in turn indexed by ECCEs. EPDCCH candidates configuring the search space may be determined based on the indexed ECCEs and then blind decoding may be performed. Thereby, control information may be received. Herein, EREG corresponds to REG in the legacy LTE/LTE-A and ECCE corresponds to CCE in the legacy LTE/LTE-A. A PRB pair may include 16 EREGs.

The UE having received an EPDCCH may transmit an ACK/NACK/DTX for the EPDCCH over the PUCCH. The index of a resource, i.e., a PUCCH resource may be determined by the lowest ECCE index of the ECCE indexes used for transmission of the EPDCCH in a manner similar to Equation 1 discussed above. That is, the index may be expressed as Equation 2 given below.

$$n_{PUCCH\text{-}ECCE}^{(1)} = n_{ECCE} + N_{PUCCH}^{(1)}$$ Equation 2

In Equation 2, $n_{PUCCH\text{-}ECCE}^{(1)}$ is the index of the PUCCH resource, $n_{ECCE}$ is the lowest ECCE index of the ECCE indexes used in transmitting the EPDCCH, and $N_{PUCCH}^{(1)}$ (which may be replaced by $N_{PUCCH,EPDCCH}^{(1)}$), which is a value delivered through higher layer signaling, represents the point where the PUCCH resource index starts.

However, if all PUCCH resource indexes are determined by Equation 2, the problem of resource collision may occur. Particularly, when two EPDCCH PRB sets are configured, the EPDCCH PRB sets may have the same PUCCH resource indexes for the EPDCCH and thus collision may occur between the indexes. FIG. 11 shows a localized EPDCCH PRB set 1101 and a distributed EPDCCH PRB set 1103 each including four PRB pairs and a PRB pair 1105 marked with REG indexes for understanding of the description. Herein, EREG indexes in each PRB pair do not represent the physical positions of EREGs, and actual EREGs may be determined as a set of cyclic indexes within a PRB pair. In the case of FIG. 11, the same location may be understood as indicating the same physical position within the physical PRB pairs. The numbers presented in each of the localized EPDCCH PRB set 1101 and the distributed EPDCCH PRB set 1103 represent ECCE indexes. Referring to FIG. 11, ECCE index 1 in the distributed EPDCCH PRB set 1103 does not overlap the resource positions in the localized EPDCCH PRB set 1101 (this can be seen from mismatch of the numbers for the corresponding EREGs), and, accordingly, localized and distributed EPDCCHs having the lowest ECCE indexes may be transmitted. In this case, however, the lowest ECCE indexes of the EPDCCHs are both 1, and thus collision between PUCCH resource indexes may occur. (Of course, the problem of such collision between PUCCH resources (indexes) may occur even if each EPDCCH PRB set includes a different number of PRB pairs, or the localized EPDCCH and the distributed EPDCCH are not multiplexed in one PRB pair, which will be described later.) When PUCCH resource collision occurs, this problem may be solved by changing the resource index for transmitting reception acknowledgement for the EPDCCH. In other words, the problem may be solved by determining the resource index for transmission of reception acknowledgement for the EPDCCH according to at least one of the type of the EPDCCH PRB set, whether or not the EPDCCH PRB sets include the same number of PRB pairs, whether or not the EPDCCH PRB sets overlap each other. Hereinafter, a detailed description will be given of methods for avoiding collision between PUCCH resource indexes in a case in which two EPDCCH PRB sets are configured for a UE, and collision occurs between PUCCH resource indexes for transmitting reception acknowledgements for the EPDCCHs of the respective sets.

In the description below, it is assumed that the PUCCH resource for reception acknowledgement for the EPDCCH of one of the two EPDCCH PRB sets which is not specifically mentioned is determined by Equation 3 given below.

$$n_{PUCCH\text{-}ECCE}^{(1)} = n_{ECCE} + N_{PUCCH}^{(1)}$$ Equation 3

In Equation 3, $n_{PUCCH\text{-}ECCE}^{(1)}$ denotes the PUCCH resource index, $n_{ECCE}$ denotes the lowest ECCE index among the ECCEs used for EPDCCH transmission, and $n_{PUCCH}^{(1)}$ (which may be replaced with $N_{PUCCH,EPDCCH}^{(1)}$), whose value is delivered through higher layer signaling, indicates the starting point of the PUCCH resource indexes.

1. A Case in which a Localized EPDCCH and a Distributed EPDCCH are Multiplexed in the Same PRB Pair 1-1. A Case in which the Size of the PRB Set for the Localized EPDCCH is Identical to that of the PRB Set for the Distributed EPDCCH The first case corresponds to a case in which two EPDCCH PRB sets having the same size are configured for a UE, and the EPDCCH PRB sets are a set for localized EPDCCH transmission and a set of distributed EPDCCH transmission. This is the case illustrated in FIG. 11 as described above. In this case, collision may be avoided by changing the lowest ECCE index used for EPDCCH transmission in the localized EPDCCH PRB set to the index of a distributed ECCE corresponding to the same EREG. In other words, an offset may be applied to a localized ECCE index such that the localized ECCE index is mapped to one of the distributed ECCE indexes overlapping the localized ECCE.

For example, referring to FIG. 11, both the localized PRB pair set and the distributed PRB pair set have 1 as the lowest ECCE index, and thus collision between the PUCCH resource indexes occurs. Herein, since EREGs 1, 5, 9 and 13 corresponding to ECCE index 1 in the localized PRB pair set represent the same resources in the distributed PRB pair set, i.e., elements of ECCE indexes 4, 5, 6 and 7, localized ECCE index 1 (5, 9, 13) cannot be multiplexed with distributed ECCE indexes 4, 5, 6 and 7. Accordingly, in determining the PUCCH resources indexes for an EPDCCH having localized RECCE indexes 1, 5, 9 and 13 as the lowest ECCE indexes, distributed ECCE indexes 4, 5, 6 and 7 may be changed to the PUCCH resource indexes.

This may be implemented by Equation 4 given below.

$$n_{PUCCH}^{(1)} = N_{PUCCH,EPDCCH}^{(1)} + n' \times A + (n_{ECCE} - n')/A,$$

$$n' = (n_{ECCE} \bmod A) \qquad \text{Equation 4}$$

In Equation 4, A denotes the total number of configured PRB pairs (or the number of ECCEs produced in a single PRB pair). In the case of FIG. 12, A is 4. n' denotes the index of a row in which the localized ECCEs are positioned.

According to Equation 4, the range of indexes of the PUCCH resources occupied by the localized ECCEs is shifted to the range of indexes occupied by the distributed ECCEs positioned in the same row through the offset of n'×A. For example, referring to FIG. 12, localized ECCEs 1, 5, 9 and 13 are located in the second row (corresponding to 'row 1' as the row index thereon in each PRB pair, and n' is 1, and thus an offset of n'×A=4 is applied to an EPDCCH having localized ECCEs 1, 5, 9 and 13 as the lowest ECCEs. That is, the PUCCH resource indexes of localized ECCE 1, 5, 9 and 13 all become $N_{PUCCH,EPDCCH}^{(1)} + 4$. This has an effect of setting the range of indexes to be identical to the range of indexes of the PUCCH resources used by distributed ECCEs 4, 5, 6 and 7 which are positioned in the same row and use the same set of EREGs.

By adding $(n_{ECCE} - n')/A$ to $N_{PUCCH,EPDCCH}^{(1)} + 4$, one PUCCH resource is determined in the index range of the PUCCH resources according to the relative positions occupied by the localized ECCEs. In the example above, localized ECCEs 1, 5, 9 and 13 will have $N_{PUCCH,EPDCCH}^{(1)} + 4$, $N_{PUCCH,EPDCCH}^{(1)} + 5$, $N_{PUCCH,EPDCCH}^{(1)} + 6$ and $N_{PUCCH,EPDCCH}^{(1)} + 7$ as PUCCH resource indexes, respectively.

As another example, for a localized EPDCCH, PUCCH resources may be determined based on the PRB pair indexes. Specifically, PUCCH resources may be determined by Equation 5 given below.

$$n_{PUCCH}^{(1)} = N_{PUCCH,EPDCCH}^{(1)} + n_{PRB} + n' \times A \qquad \text{Equation 5}$$

In Equation 5, $n_{PRB}$ denotes the index (an index within the EPDCCH PRB set) of the first/lowest PRB pair in which the corresponding EPDCCH is transmitted, n' denotes the index of a row in which localized ECCEs are positioned, and A denotes the total number of configured PRB pairs (or the number of ECCEs produced in a single PRB pair).

According to Equation 5, when an index of a localized ECCE increases by 1 in a PRB pair, a relevant PUCCH index increases by A. Thereby, the index may be matched with the PUCCH index used by a distributed ECCE having the same EREGs as those of the localized ECCE. For example, referring to FIG. 14, since $n_{PRB}$ is 0, n' is 1, and A is 4, the PUCCH index of localized ECCE 1 becomes $N_{PUCCH,EPDCCH}^{(1)} + 4$. Thereby, collision with the PUCCH resource index of a distributed EPDCCH having 1 as the lowest ECCE index may be avoided.

If there is a relation between a localized ECCE and an antenna port (AP) of a DMRS for detecting the localized ECCE, the index of the AP may be used in Equation 5 to give Equation 6 below.

$$n_{PUCCH}^{(1)} = N_{PUCCH,EPDCCH}^{(1)} + n_{PRB} + n_{AP} \times A \qquad \text{Equation 6}$$

Here, $n_{AP}$ has a value derived from the index of an AP that is used to detect the EPDCCH. In the case in which APs p, p+1, . . . , and p+k−1 can be used for detection of a localized EPDCCH, if a specific EPDCH has been detected using AP x, $n_{AP}$ may be given as $n_{AP} = x - p$. The localized ECCEs in the PRB pairs may be pre-associated with APs one by one. When two or more ECCEs are used, one of the APs may be selected according to a predetermined rule.

Similar to the case of Equation 6, $n_{AP}$ may be reflected in Equations 4 and 5 to define Equation 7 and 8 given below.

$$n_{PUCCH}^{(1)} = N_{PUCCH,EPDCCH}^{(1)} + n' \times A + (n_{ECCE} - n')/A + (n_{AP} \bmod L) \times A \qquad \text{Equation 7}$$

In Equation 7, L denotes the aggregation level of the EPDCCH. ($n_{AP} \bmod L$) is used, considering that the number of APs among which an AP for the localized EPDCCH is selected increases as the aggregation level increases.

$$n_{PUCCH}^{(1)} = N_{PUCCH,EPDCCH}^{(1)} + n_{PRB} + n' \times A + (n_{AP} \bmod L) \times A \qquad \text{Equation 8}$$

Meanwhile, in the case in which the number of REs which can be used for an EPDCCH within a single PRB pair decreases, the number of ECCEs formed in one PRB pair may be reduced, or the smallest EPDCCH transmission unit may be set to multiple ECCEs rather than to one ECCE. In this case, it is preferable that the number of ECCEs which can be substantially used is reduced and thus the number of resources used for HARQ-ACK is reduced. To perform such PUCCH resource adjustment, the parameter A (the total number of PRB pairs (or the number of ECCEs produced in a single PRB pair)) used in the above equation may be changed according to the number of ECCEs formed in one PRB pair (or the smallest EPDCCH transmission unit). For example, when the number of ECCEs formed in one PRB pair is 1/N (or when the smallest EPDCCH transmission unit is N ECCEs), PUCCH resources may be adjusted by using A/N in place of the parameter A such that fewer PUCCH resources are used.

In the description above, if the number of ECCEs per PRB pair is not 4, Equation 9 given below may be used.

$$n^{(1)}_{PUCCH-LECCE} = N^{(1)}_{PUCCH} + N \cdot \underbrace{\frac{n'}{AP\ index}} + \underbrace{\left\lfloor \frac{n_{LECCE}}{d} \right\rfloor}_{PRB\ index} \quad \text{Equation 9}$$

$$n^{(1)}_{PUCCH-DECCE} = N^{(1)}_{PUCCH} + n_{DECCE}$$

In this equation, $n_{DECCE}$ and $n_{LECCE}$ respectively denote the first/lowest ECCE index of a distributed ECCE and the first/lowest ECCE index of a localized ECCE, N denotes the number of PRB pairs, and $n'=n_{LECCE}$ mod d denotes an AP index and may be represented as $$k_p = \left\lfloor \frac{(p-107)}{4/d} \right\rfloor, p \in \{107, 108, 109, 110\}.$$

Here, d denotes the number of ECCEs per PRB pair.

As mentioned above, the equation above is indented for a case in which the number of ECCEs per PRB pair is not 4. For example, there may be a case in which the number of ECCEs in a PRB pair is set to 2 (d=2) rather than to 4 (d=4) (for example, only two APs are used in the case of the extended CP) in order to efficiently manage the PUCCH resources. Otherwise, there may be a case in which aggregation level 1 is skipped since the number of ECCEs which can be utilized per PRB pair is insufficient. In this case, d=2 may be applied in place of d=4 in order to efficiently use the PUCCH resources.

In FIG. 12, the numbers stand for localized ECCE indexes, and the arrows indicate ECCEs corresponding to PUCCH resources which are used according to Equation 9. For example, ECCE 1 uses the PUCCH resource of ECCE 8 according to Equation 9. In this case, if distributed ECCE 1 is selected among EREGs belonging to localized ECCEs 4, 12, 20 and 28, overlapping between localized/distributed EPDCCHs may not occur.

ECCE indexes may overlap even if the localized/distributed EPDCCHs are not multiplexed in the same PRB pair unlike in the case of N=4. To avoid collision between PUCCH resources, localized ECCE 1 is mapped to one of the distributed ECCE indexes overlapping localized ECCE 1. Since a distributed ECCE and localized ECCEs overlapping the distributed ECCE cannot be selected simultaneously, the indexes of the localized ECCEs become unused indexes. In this case, any one of the distributed ECCE indexes overlapping the localized ECCE can be selected.

1-2. A Case in which the Size of the PRB Set for the Localized EPDCCH is Different from that of the PRB Set for the Distributed EPDCCH 1-2-1. A Case in which the PRB Set for the Localized EPDCCH is a Subset of the PRB Set for the Distributed EPDCCH When a PRB set for the localized EPDCCH and a PRB set for the distributed EPDCCH are configured for a UE, collision between PUCCH resources (indexes) may occur in the case in which the sizes of the two PRB sets are different from each other, particularly, the PRB set for the localized EPDCCH is a subset of the PRB set for the distributed EPDCCH.

Figure 13:
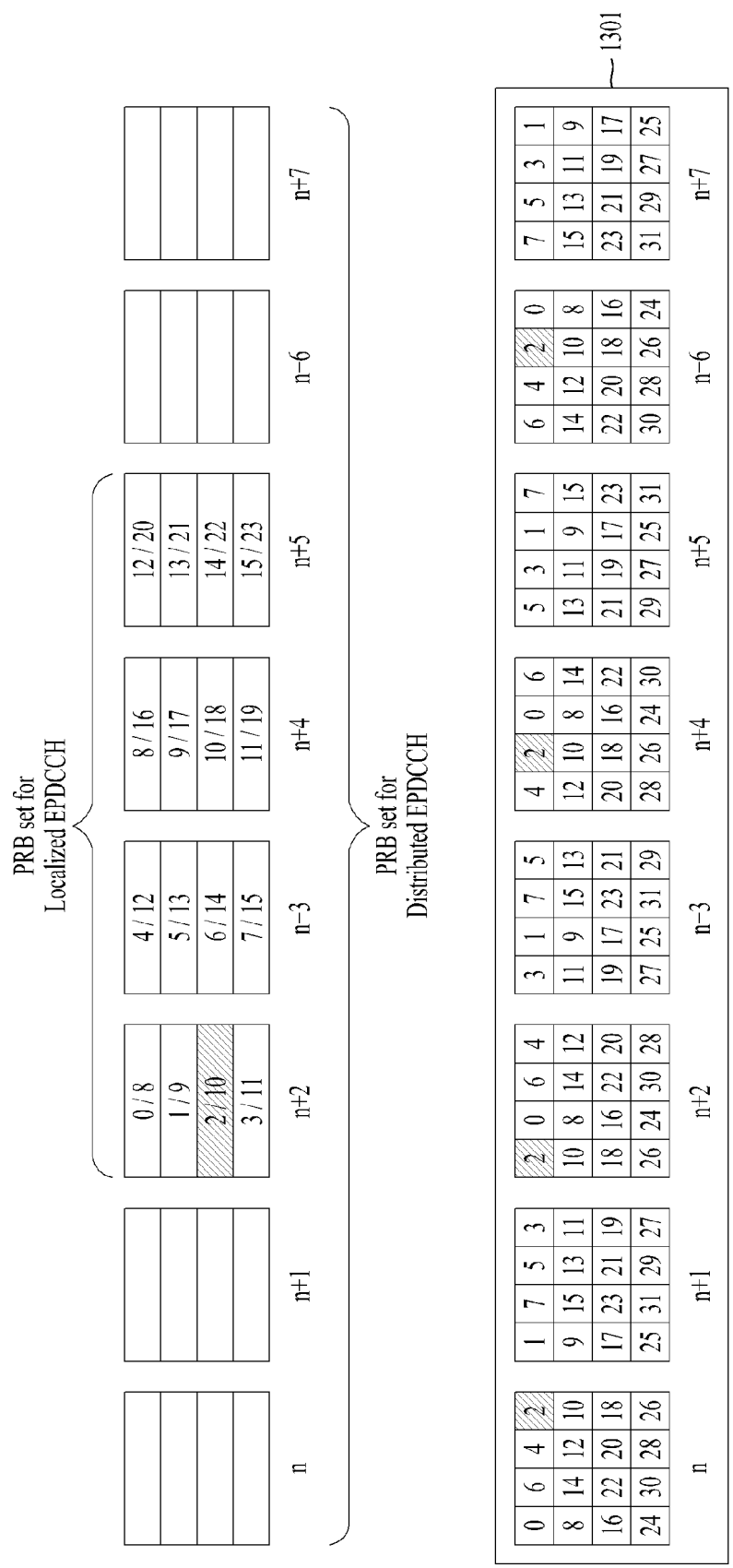

This case is illustrated in FIG. 13. Referring to FIG. 13, it is assumed that the PRB set for the distributed EPDCCH includes PRB pairs n to n+7, and the PRB set for the localized EPDCCH includes PRB pairs n+2 to n+5. Additionally, ECCE indexes 1301 of the PRB set for the distributed EPDCCH are shown at the bottom of FIG. 13 for understanding of this set. Regarding the PRB set, the numbers in the form of 'X/Y' indicates "ECCE index of the localized EPDCCH PRB set/ECCE index of the localized EPDCCH PRB set including the same number of PRB pairs as the distributed EPDCCH PRB set."

Referring to FIG. 13, if the lowest ECCE index of the localized EPDCCH PRB set is 2, the localized EPDCCH does not have resources overlapping those of the distributed EPDCCH having ECCE index 2 as the lowest index, and accordingly the localized EPDCCH and the distributed EPDCCH can be multiplexed. In this case, however, the localized EPDCCH and the distributed EPDCCH have the same lowest ECCE index, and accordingly collision occurs between PUCCH resource indexes for transmission of reception acknowledgements for the localized and distributed EPDCCHs when the localized and distributed EPDCCHs are transmitted simultaneously.

To prevent this collision, the ECCE indexes of the localized EPDCCH PRB set may be replaced with ECCE indexes given when the same number of PRB pairs as that of the PRB pairs of the distributed EPDCCH PRB set is provided (for the localized EPDCCH PRB set). For example, in order to prevent collision between PUCCH resources (indexes), PUCCH resources indexes may be computed by replacing ECCE index 2 in the localized EPDCCH PRB set with ECCE index 10 which is given in case that the set has 8 PRB pairs.

Specifically, the resource index $n_{PUCCH-LECCE}^{(1)}$ for transmission of reception acknowledgement for the EPDCCH of the localized EPDCCH PRB set may be determined by Equation 10 below, and the resource index $n_{PUCCH-DECCE}^{(1)}$ for transmission of reception acknowledgement for the EPDCCH of the distributed EPDCCH PRB set may be determined by Equation 11 below.

$$n^{(1)}_{PUCCH-LECCE} = N^{(1)}_{PUCCH} + N \cdot n' + \left\lfloor \frac{n_{LECCE}}{d} \right\rfloor + T_{offset} \quad \text{Equation 10}$$

$$n^{(1)}_{PUCCH-DECCE} = N^{(1)}_{PUCCH} + n_{DECCE} \quad \text{Equation 11}$$

In these equations, $N_{PUCCH}^{(1)}$ denotes the starting point of the PUCCH resource indexes and has a value delivered through higher layer signaling, $n_{DECCE}$ and $n_{LECCE}$ respectively denote the lowest ECCE indexes for the distributed and localized EPDCCHs, N denotes the number of PRB pairs, $n'=n_{LECCE}$ mod d denotes an AP index, d denotes the number of ECCEs per PRB pair, and $T_{offset}$ denotes an offset value for compensating the difference between PRB pair indexes.

Figure 14:
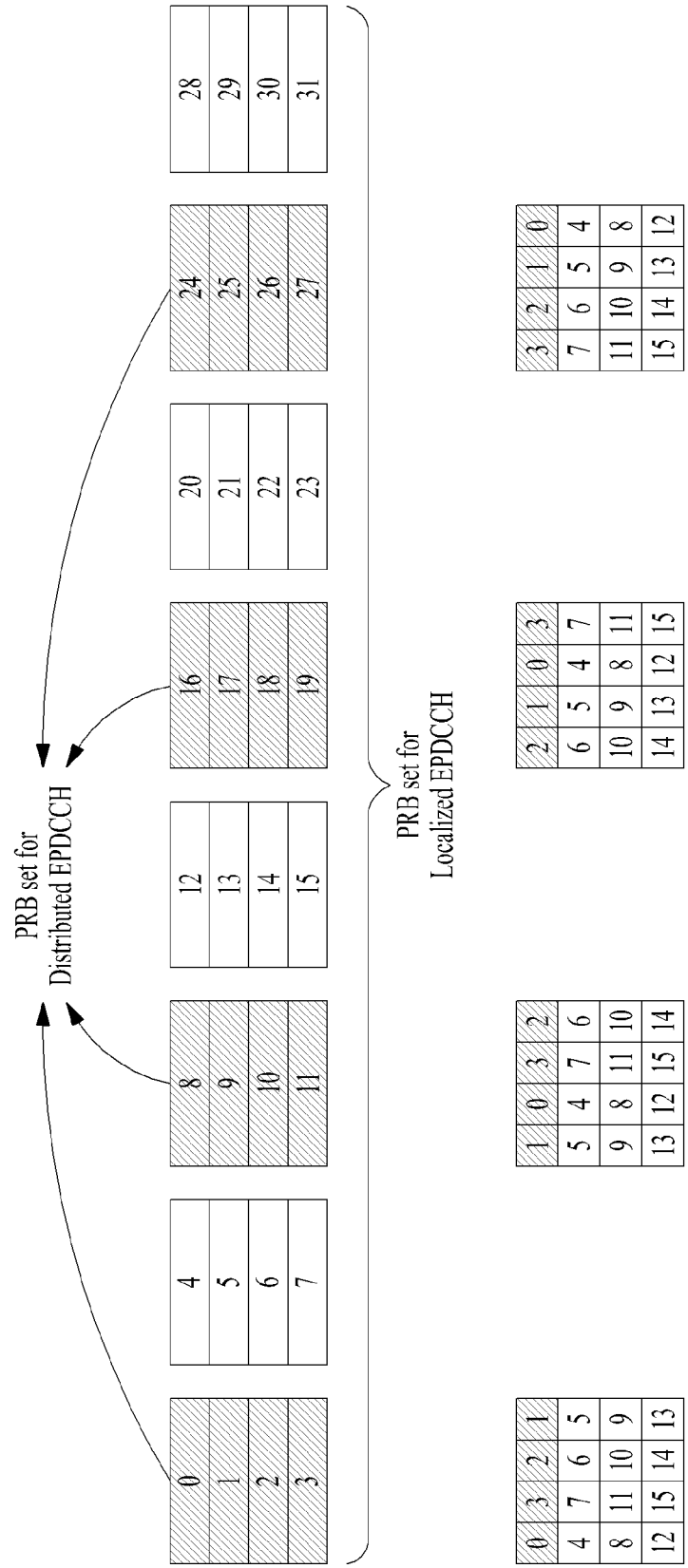

1-2-2. A Case in which the PRB Set for the Distributed EPDCCH is a Subset of the PRB Set for the Localized EPDCCH When a PRB set for the localized EPDCCH and a PRB set for the distributed EPDCCH are configured for a UE, collision may also occur between PUCCH resources (indexes) in the case in which the PRB set for the distributed EPDCCH is a subset of the PRB set for the localized EPDCCH, unlike case 1-2-1 described above. For example, as shown in FIG. 14, ECCE indexes 0, 1, 2 and 3 of the distributed EPDCCH PRB set (see ECCE indexes of the distributed EPDCCH PRB set shown at the bottom of FIG. 14) overlap ECCE indexes 0, 8, 16 and 24 of the localized EPDCH PRB set, namely they correspond to the same resources as those for ECCE indexes 0, 8, 16 and 24. This means that the two types of EPDCCHs cannot be transmitted simultaneously. Accordingly, in determining resources indexes for transmission of reception acknowledgement for the distributed EPDCCH, the ECCE indexes in the distributed EPDCCH PRB set may be changed to the ECCE indexes in the localized EPDCCH PRB set having the same EREGs to prevent collision between PUCCH resources (indexes).

In other words, by applying a predetermined offset to the lowest ECCE index constituting the distributed EPDCCH in determining the PUCCH resources for the distributed EPDCCH, the ECCE indexes for the distributed EPDCCH are shifted PUCCH resources for the localized EPDCCH that overlaps the distributed EPDCCH.

The above description of FIG. 14 may be represented as Equation 12 given below.

$$n^{(1)}_{PUCCH-LECCE} = N^{(1)}_{PUCCH} + n_{LECCE} \quad \text{Equation 12}$$

$$n^{(1)}_{PUCCH-DECCE} = N^{(1)}_{PUCCH} + 8 \cdot \mod(n_{DECCE}, 4) + \left\lfloor \frac{n_{DECCE}}{4} \right\rfloor$$

This equation is generalized to Equation 13 below.

$$n^{(1)}_{PUCCH-LECCE} = N^{(1)}_{PUCCH} + \left\lfloor \frac{n_{ECCE}}{d} \right\rfloor \times d + k_P \quad \text{Equation 13}$$

$$n^{(1)}_{PUCCH-DECCE} = N^{(1)}_{PUCCH} + d \cdot \mod(n_{ECCE}, N_D) + \left\lfloor \frac{n_{ECCE}}{N_D} \right\rfloor$$

In this equation, $n_{PUCCH-LECCE}^{(1)}$ denotes a resource index for transmission of reception acknowledgement for the EPDCCH of the localized EPDCCH PRB set, $n_{PUCCH-DECCE}^{(1)}$ denotes a resource index for transmission of reception acknowledgement for the EPDCCH of the distributed EPDCCH PRB set, $N_{PUCCH}^{(1)}$ the starting point of the PUCCH resource indexes and has a value delivered through higher layer signaling, $n_{DECCE}$ and $n_{LECCE}$ respectively denote the lowest ECCE indexes for the distributed and localized EPDCCHs, $N_D$ denotes the number of PRB pairs for the distributed EPDCCH, $k_p$ denotes a value related to an AP, which may be determined according to Table 5 given below, and d denotes the number of ECCEs in a PRB pair.

When d=2, the AP number p may be associated with one of {107, 109} and {108, 110}. If the number of available REs in a PRB pair is insufficient, aggregation level 1 may not be supported. In this case, although d=4 d=2 may be applied in order to reduce the number of PUCCH resources.

TABLE 5

| | d = 2 | d = 4 |
|---|---|---|
| Normal CP | $k_p = \left\lfloor \frac{p - 107}{2} \right\rfloor$ | $k_p = p - 107$ |
| Extended CP | $k_p = p - 107$ | N/A |

Equation 13 represents a case in which collision between localized ECCEs and PUCCH resources is avoided by applying permutation to the distributed ECCEs while applying the localized ECCE indexes to PUCCH resources as they are. This equation may also be applied to a case in which the number of PRBs applied to the distributed EPDCCH set is different from that of PRBs applied to the localized EPDCCH set and a case in which the number of ECCEs per PRB is 2.

2. A Case in which the Distributed EPDCCH and the Distributed EPDCCH are Multiplexed in the Same PRB Pair The description has been given above of a case in which two EPDCCH PRB sets, one of which is for localized EPDCCH transmission and the other of which is for EPDCCH transmission, are configured for a UE, and the PRB sets overlap each other (namely, the localized EPDCCH and the distributed EPDCCH are multiplexed in a PRB pair). In another case in which the PRB sets are both for distributed EPDCCH transmission, collision may occur between PUCCH resources (indexes). This case will be described below with reference to FIG. 15.

Figure 15:
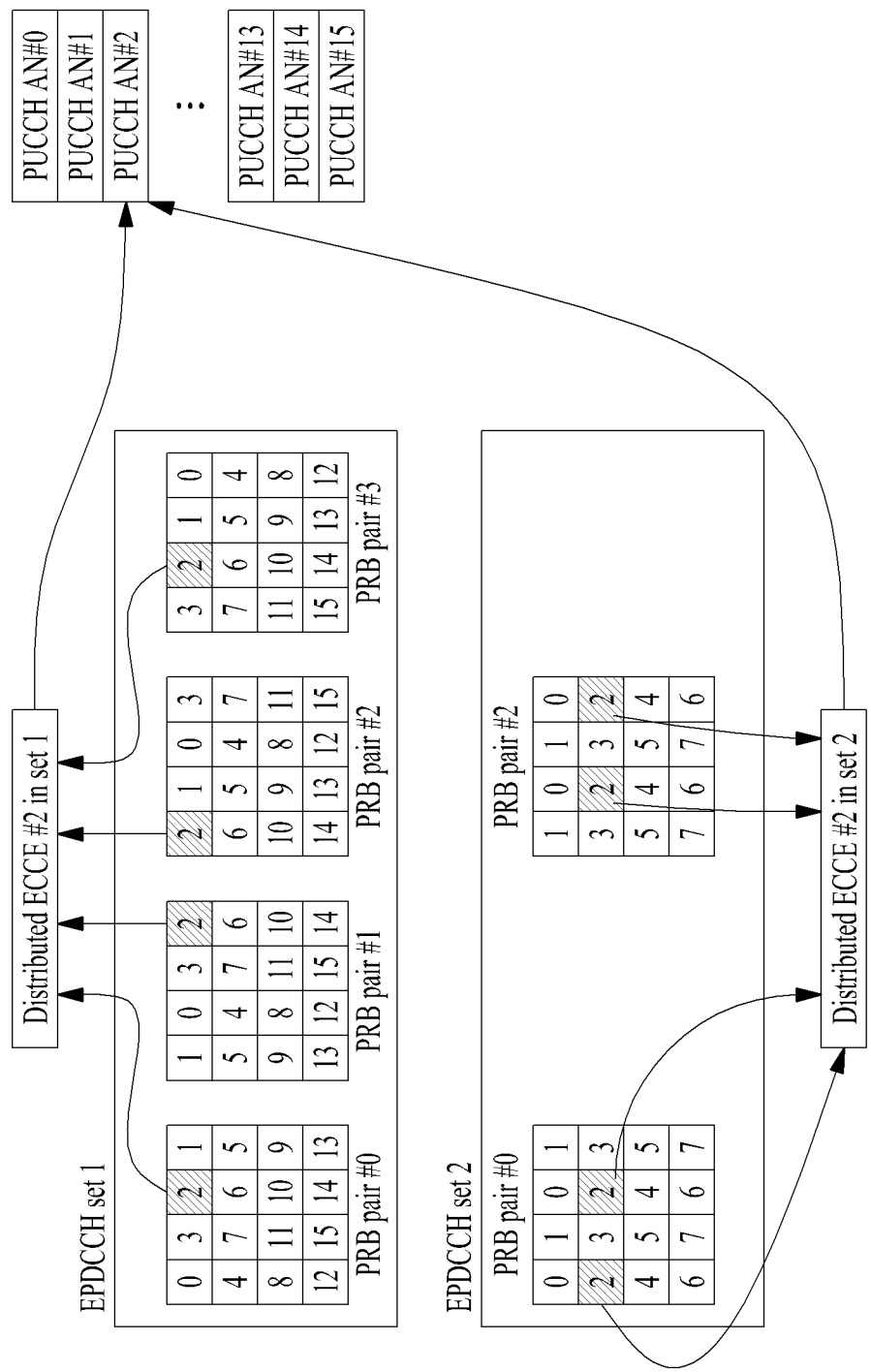

FIG. 15 shows a distributed EPDCCH PRB set having four PRB pairs (EPDCCH set 1) and a distributed EPDCCH PRB set having two PRB pairs (EPDCCH set 2). In this case, multiplexing is feasible since ECCE index 2 from EPDCCH set 1 and ECCE index 2 from EPDCCH set 2 correspond to different EREGs. However, as shown in FIG. 15, both indexes are related to the same PUCCH resource index (PUCCH AN#2), and thus collision may occur.

Figure 16:
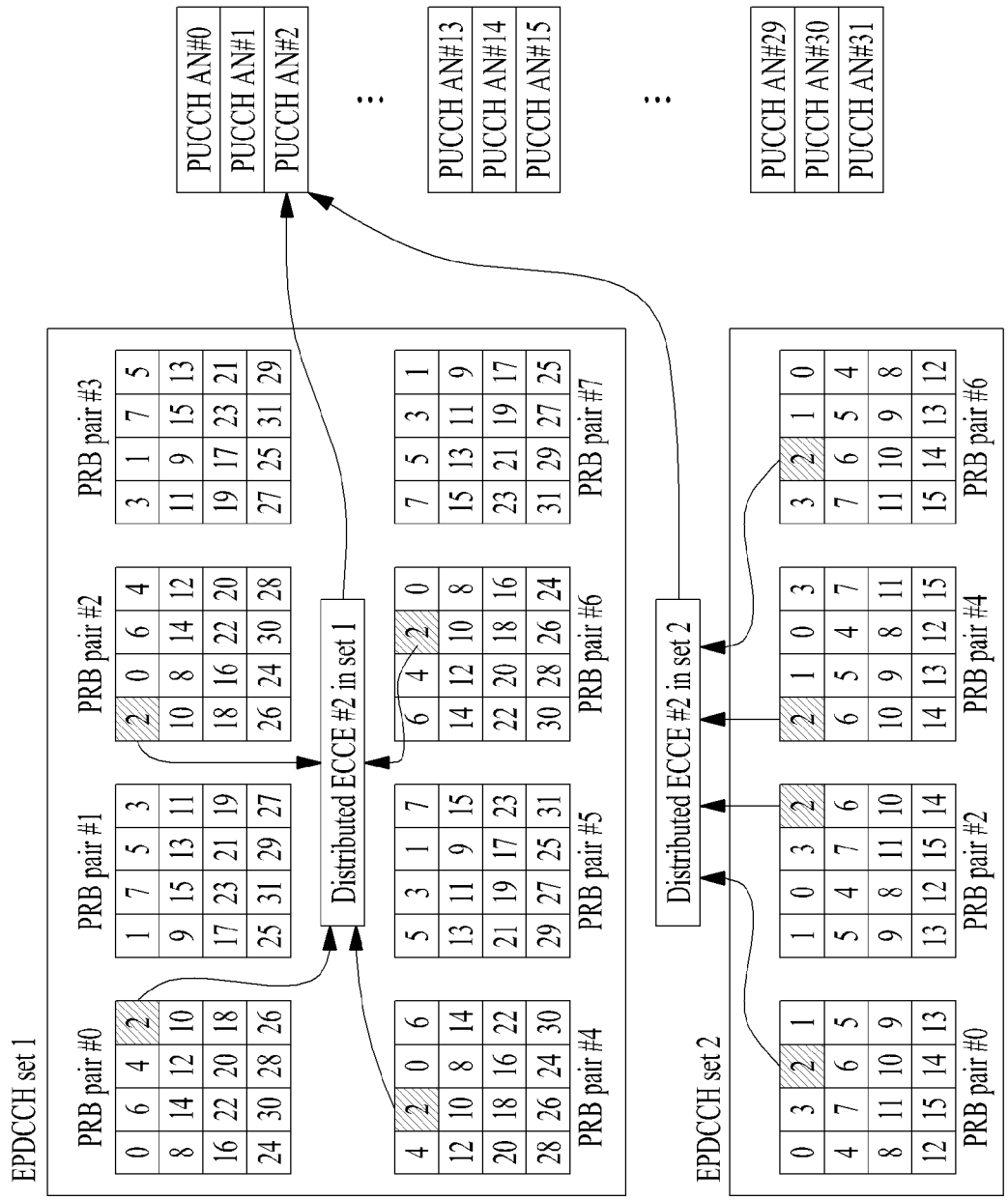

FIG. 16 shows a distributed EPDCCH PRB set having 8 PRB pairs (EPDCCH set 1) and a distributed EPDCCH PRB set having 2 PRB pairs (EPDCCH set 2). In this case, EPDCCHs having ECCE index 2 as the lowest ECCE index may be simultaneously transmitted using the same PUCCH resource, and thus collision may occur.

Such PUCCH resource (index) collision may be addressed by determining a PUCCH resource index for transmission of reception acknowledgement for the EPDCCH of the set having the smaller number of PRB pairs in consideration of the ratio between the PRB pairs of EPDCCH PRB sets 1 and 2. Here, the ratio between the PRB pairs is a ratio of the number of PRB pairs of one set having the larger number PRB pairs to the number of PRB pairs of the other set.

For example, in the cases of FIGS. 15 and 16, the ratio between PRB pairs is 2, and thus collision may be prevented by doubling the lowest ECCE index to determine a PUCCH resource index for the EPDCCH of EPDCCH set 2 having the smaller number of PRB pairs. That is, the PUCCH resource index for the EPDCCH of EPDCCH set 2 may be determined by Equation 14 given below.

$$n_{PUCCH-DECCE}^{(1)} = N_{PUCCH}^{(1)} + 2 \times n_{DECCE-set2} \quad \text{Equation 14}$$

This equation may be generalized to Equation 15 below.

$$n_{PUCCH-DECCE}^{(1)} = N_{PUCCH}^{(1)} + T \times n_{DECCE-set2} \quad \text{Equation 15}$$

In Equation 15, when the start (lowest) PRB index of the set having the smaller size is further considered, Equation 16 given below can be obtained.

$$n_{PUCCH-DECCE}^{(1)} = N_{PUCCH}^{(1)} + T \times n_{DECCE-set2} + X \quad \text{Equation 15}$$

In this equation, $N_{PUCCH}^{(1)}$ denotes the starting point of the PUCCH resource indexes and has a value delivered through higher layer signaling, T denotes a value obtained by diving the number of PRB pairs of one set having the larger number of PRB pairs by the number of PRB pairs of the other set, X is the lowest index of a PRB pair, and $n_{DECCE-set2}$ denotes the lowest ECCE index of the set having the smaller number of PRB pairs.

Figure 17:
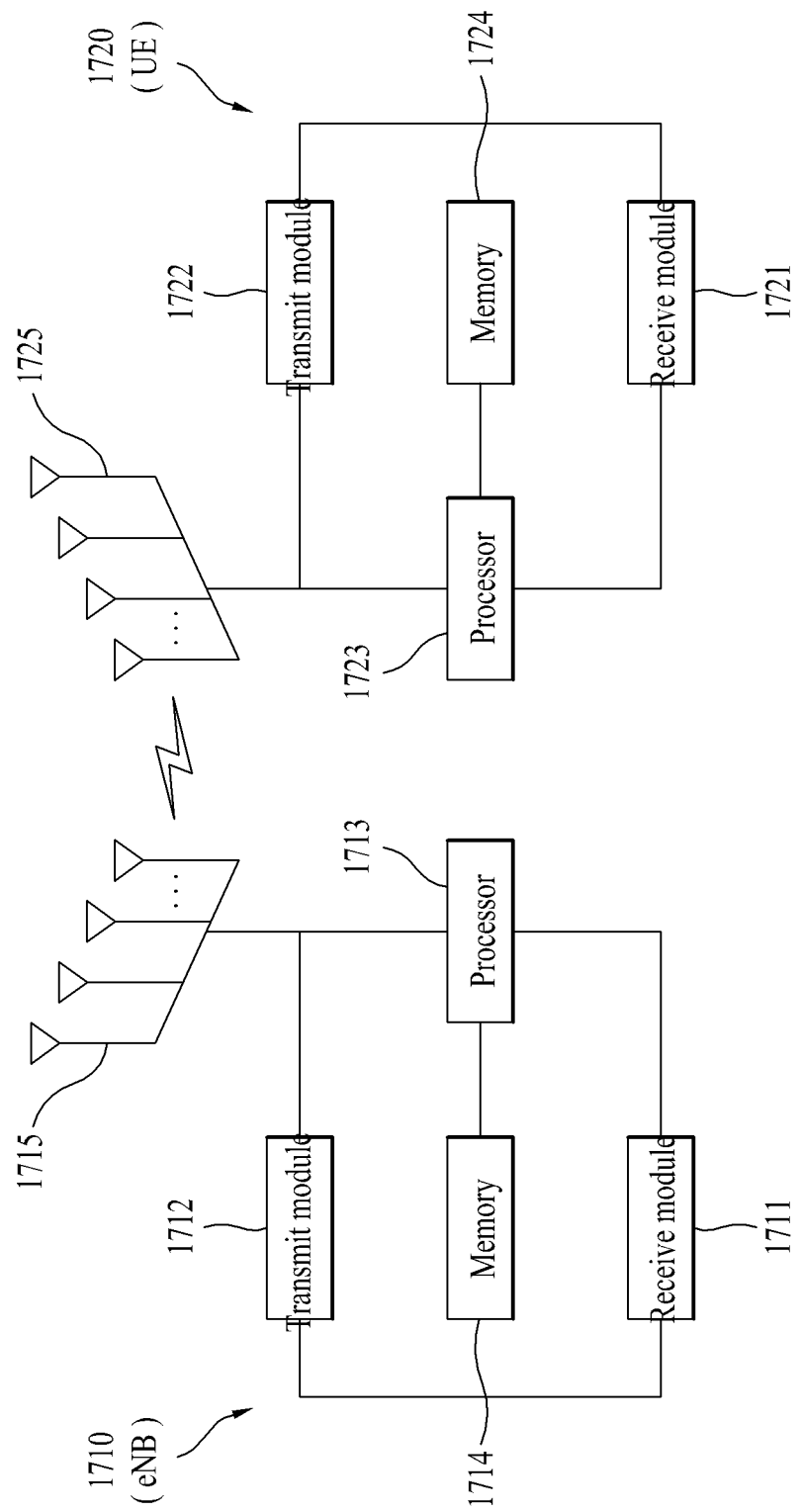
FIG. 17 is a diagram illustrating configuration of transceivers.

Configuration of Apparatuses According to One Embodiment of the Present Invention FIG. 17 is a diagram illustrating configurations of a transmit point and a UE according to one embodiment of the present invention.

Referring to FIG. 17, a transmit point 1710 may include a receive module 1711, a transmit module 1712, a processor 1713, a memory 1714, and a plurality of antennas 1715. The antennas 1715 represent the transmit point that supports MIMO transmission and reception. The receive module 1711 may receive various signals, data and information from a UE on uplink. The transmit module 1712 may transmit various signals, data and information to a UE on downlink. The processor 1713 may control overall operation of the transmit point 1710.

The processor 1713 of the transmit point 1710 according to one embodiment of the present invention may perform operations necessary for the embodiments described above.

Additionally, the processor 1713 of the transmit point 1710 may function to computationally process information received by the transmit point 1710 or information to be transmitted to the outside, etc. The memory 1714, which may be replaced with an element such as a buffer (not shown), may store the computationally processed information for a predetermined time.

Referring to FIG. 17, a UE 1720 may include a receive module 1721, a transmit module 1722, a processor 1723, a memory 1724, and a plurality of antennas 1725. The antennas 1725 mean that the UE supports MIMO transmission and reception. The receive module 1721 may receive various signals, data and information from an eNB on downlink. The transmit module 1722 may transmit various signals, data and information to the eNB on uplink. The processor 1723 may control overall operation of the UE 1720.

The processor 1723 of the UE 1720 according to one embodiment of the present invention may perform operations necessary for the embodiments described above.

Additionally, the processor 1723 may function to computationally process information received by the UE 1720 or information to be transmitted to the outside, and the memory 1724, which may be replaced with an element such as a buffer (not shown), may store the computationally processed information for a predetermined time.

The configurations of the transmit point and the UE as described above may be implemented such that the above-described embodiments are independently applied or two or more thereof are simultaneously applied, and description of redundant parts is omitted for clarity.

Description of the transmit point 1710 in FIG. 17 may also be applied to a relay which serves as a downlink transmitter or an uplink receiver, and description of the UE 1720 may be equally applied to a relay which serves as a downlink receiver or an uplink transmitter.

The embodiments of the present invention may be implemented through various means, for example, hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for transmitting reception acknowledgement for an enhanced physical downlink control channel (EPDCCH) by a user equipment (UE) in a wireless communication system, the method comprising:

decoding an EPDCCH in each of a first EPDCCH Physical Resource Block (PRB) set and a second EPDCCH PRB set; and transmitting a reception acknowledgement for each of the EPDCCHs, wherein one of a PRB pair ratio between the first and second EPDCCH PRB sets or an Enhanced Control Channel Element (ECCE) index change in an overlapping EPDCCH PRB set of the first EPDCCH PRB set and the second EPDCCH PRB set is used for determining a resource index for transmitting the reception acknowledgement for each of the EPDCCHs.

2. The method according to claim 1, wherein, when the first and second EPDCCH PRB sets are intended for transmission of a distributed EPDCCH, and a number of PRB pairs included in the first EPDCCH PRB set is different from a number of PRB pairs included in the second EPDCCH PRB set, the resource index for transmitting the reception acknowledgement for the EPDCCH of one of the first and second EPDCCH PRB sets is determined in consideration of a PRB pair ratio between the first and second EPDCCH PRB sets, the one of the first and second EPDCCH PRB sets including a smaller number of PRB pairs than the other one of the first and second EPDCCH PRB sets.

3. The method according to claim 2, wherein the PRB pair ratio is a ratio of the number of PRB pairs included in the other one of the first and second EPDCCH PRB sets to the number of PRB pairs included in the one of the first and second EPDCCH PRB sets having the smaller number of PRB pairs.

4. The method according to claim 2, wherein the first EPDCCH PRB set and the second EPDCCH PRB set include PRB pairs overlapping each other.

5. The method according to claim 2, wherein the resource index for transmitting the reception acknowledgement for the EPDCCH of the one of the first and second) EPDCCH PRB sets having the smaller number of PRB pairs, $n_{PUCCH\text{-}DECCE}^{(1)}$, is determined by the following equation:

$$n_{PUCCH\text{-}DECCE}^{(1)} = N_{PUCCH}^{(1)} + T \times n_{DECCE\text{-}set2},$$

wherein $N_{PUCCH}^{(1)}$ denotes a starting point of Physical Uplink Control Channel (PUCCH) resource indexes and has a value delivered through higher layer signaling, T denotes a value obtained by dividing the number of PRB pairs of the other one of the first and second EPDCCH PRB sets by the number of PRB pairs of the one of the first and second EPDCCH PRB sets having the smaller number of PRB pairs, and $n_{DECCE\text{-}set2}$ denotes a lowest ECCE index of the one of the first and second EPDCCH PRB sets having the smaller number of PRB pairs.

6. The method according to claim 1, wherein the resource index for transmitting the reception acknowledgement for the EPDCCH of the one of the first and second EPDCCH PRB sets including the smaller number of PRB pairs, $n_{PUCCH\text{-}DECCE}^{(1)}$, is determined by the following equation:

$$n_{PUCCH\text{-}DECCE}^{(1)} = N_{PUCCH}^{(1)} + T \times n_{DECCE\text{-}set2} - X,$$

wherein, $N_{PUCCH}^{(1)}$ denotes a starting point of Physical Uplink Control Channel (PUCCH) resource indexes and has a value delivered through higher layer signaling, T denotes a value obtained by dividing the number of PRB pairs of the other one of the first and second EPDCCH PRB sets by the number of PRB pairs of the one of the first and second EPDCCH PRB sets having the smaller number of PRB pairs, X is a lowest index of the PRB pairs, and $n_{DECCE\text{-}set2}$ denotes a lowest Enhanced Control Channel Element (ECCE) index of the one of the first and second EPDCCH PRB sets having the smaller number of PRB pairs.

7. The method according to claim 1, wherein, when the first and second EPDCCH PRB sets are for transmission of a localized EPDCCH and transmission of a distributed EPDCCH, respectively, and the first EPDCCH PRB set is a subset of the second EPDCCH PRB set,
an ECCE index in the first EPDCCH PRB set is replaced with an ECCE index given when the first EPDCCH PRB set has the same number of PRB pairs as the second EPDCCH PRB set.

8. The method according to claim 1, wherein, when the first and second EPDCCH PRB sets are for transmission of a localized EPDCCH and transmission of a distributed EPDCCH, respectively, and the first EPDCCH PRB set is a subset of the second EPDCCH PRB set,
the resource index for transmitting the reception acknowledgement for the EPDCCH of the first EPDCCH PRB set, $n_{PUCCH\text{-}DECCE}^{(1)}$, is determined by the following equation:

$$n_{PUCCH\text{-}LECCE}^{(1)} = N_{PUCCH}^{(1)} + N \cdot n' + \left\lfloor \frac{n_{LECCE}}{d} \right\rfloor + T_{offset},$$

wherein the resource index for transmitting the reception acknowledgement for the EPDCCH of the second EPDCCH PRB set, $n_{PUCCH\text{-}DECCE}^{(1)}$, is determined by the following equation:

$$n_{PUCCH\text{-}DECCE}^{(1)} = N_{PUCCH}^{(1)} - n_{DECCE},$$

wherein $n_{DECCE}^{(1)}$ denotes a starting point of Physical Uplink Control Channel (PUCCH) resource indexes and has a value delivered through higher layer signaling, $n_{DECCE}$ and $n_{LECCE}$ respectively denote a lowest ECCE index for the distributed EPDCCH and a lowest ECCE index for the localized EPDCCH, N denotes the number of PRB pairs, n'=$n_{LECCE}$ mod d denotes an antenna port index, denotes the number of ECCEs per PRB pair, and $T_{offset}$ denotes an offset value for compensating for a difference between PRB pair indexes.

9. The method according to claim 1, wherein, when the first and second EPDCCH PRB sets are for transmission of a localized EPDCCH and transmission of a distributed EPDCCH, respectively, and the second EPDCCH PRB set is a subset of the first EPDCCH PRB set,
an ECCE index in the second EPDCCH PRB set is changed to an ECCE index in the first EPDCCH PRB set including the same Enhanced Resource Element Group (EREG) as the second EPDCCH PRB set in determining the resource index for transmitting the reception acknowledgement for the EPDCCH of the second EPDCCH PRB set.

10. The method according to claim 1, wherein, when the first and second EPDCCH PRB sets are for transmission of a localized EPDCCH and transmission of a distributed EPDCCH, respectively, and the second EPDCCH PRB set is a subset of the first EPDCCH PRB set, the resource index for transmitting the reception acknowledgement for the EPDCCH of the first EPDCCH PRB set, $n_{PUCCH\text{-}LECCE}^{(1)}$, is determined by the following equation:

$$n_{PUCCH\text{-}LECCE}^{(1)} = N_{PUCCH}^{(1)} + \left\lfloor \frac{n_{ECCE}}{d} \right\rfloor \times d + k_P,$$

wherein the resource index for transmitting the reception acknowledgement for the EPDCCH of the second EPDCCH PRB set, $n_{PUCCH\text{-}DECCE}^{(1)}$, is determined by the following equation:

$$n_{PUCCH\text{-}DECCE}^{(1)} = N_{PUCCH}^{(1)} + d \cdot \mathrm{mod}(n_{ECCE}, N_D) + \left\lfloor \frac{n_{ECCE}}{N_D} \right\rfloor,$$

wherein $n_{PUCCH}^{(1)}$ denotes a starting point of Physical Uplink Control Channel (PUCCH) resource indexes and has a value delivered through higher layer signaling, $n_{DECCE}$ and $n_{LECCE}$ respectively denote a lowest ECCE index for the distributed EPDCCH and a lowest ECCE index for the localized EPDCCH, $N_D$ denotes the number of PRB pairs for the distributed EPDCCH, $k_p$ denotes a value related to an antenna port, and d denotes the number of ECCEs in a PRB pair.

11. The method according to claim 10, wherein, when d=4 in a normal cyclic prefix, $k_p$=p−107, p∈{107,108,109,110}.

12. The method according to claim 1, wherein the first and second EPDCCH PRB sets are indicated by higher layer signaling.

13. A user equipment (UE) in a wireless communication system, the UE comprising:
- a receive device; and
- a processor,
- wherein the processor decodes an enhanced physical downlink control channel (EPDCCH) which is received via the receive device in each of a first EPDCCH Physical Resource Block (PRB) set and a second EPDCCH PRB set, and transmits a reception acknowledgement for each of the EPDCCHs,
- wherein one of a PRB pair ratio between the first and second EPDCCH PRB sets or an Enhanced Control Channel Element (ECCE) index change in an overlapping EPDCCH PRB set of the first EPDCCH PRB set and the second EPDCCH PRB set is used for determining a resource index for transmitting the reception acknowledgement for each of the EPDCCHs.

* * * * *